(12) United States Patent
Nachimuthu et al.

(10) Patent No.: US 10,277,677 B2
(45) Date of Patent: Apr. 30, 2019

(54) MECHANISM FOR DISAGGREGATED STORAGE CLASS MEMORY OVER FABRIC

(71) Applicant: INTEL CORPORATION, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 15/262,473

(22) Filed: Sep. 12, 2016

(65) Prior Publication Data

US 2018/0077235 A1    Mar. 15, 2018

(51) Int. Cl.
*G06F 13/00* (2006.01)
*H04L 29/08* (2006.01)
(Continued)

(52) U.S. Cl.
CPC ............ *H04L 67/1097* (2013.01); *G06F 3/06* (2013.01); *G06F 12/00* (2013.01); *G06F 13/00* (2013.01);
(Continued)

(58) Field of Classification Search
USPC ......................................................... 711/147
See application file for complete search history.

(56) References Cited

U.S. PATENT DOCUMENTS 5,014,315 A * 5/1991 Polyak ................... H04Q 11/04
                                                   370/434

8,312,660 B1 * 11/2012 Fujisaki ................... F41A 17/08
                                                   42/70.01
(Continued)

OTHER PUBLICATIONS

PCT/US2017/046847 International Search Report, 5 pages.
PCT/US2017/046847 Written Opinion of the International Searching Authority, 12 pages.

*Primary Examiner* — Sean D Rossiter
(74) *Attorney, Agent, or Firm* — Law Office of R. Alan Burnett, P.S

(57) ABSTRACT

Mechanisms for disaggregated storage class memory over fabric and associated methods, apparatus, and systems. A rack is populated with pooled system drawers including pooled compute drawers and pooled storage class memory (SCM) drawers, also referred to as SCM nodes. Optionally, a pooled memory drawer may include a plurality of SCM nodes. Each SCM node provides access to multiple storage class memory devices. Compute nodes including one or more processors and local storage class memory devices are installed in the pooled compute drawers, and are enabled to be selectively-coupled to access remote storage class memory devices over a low-latency fabric. During a memory access from an initiator node (e.g., a compute node) to a target node including attached disaggregated memory (e.g., an SCM node), a fabric node identifier (ID) corresponding to the target node is identified, and an access request is forwarded to that target node over the low-latency fabric. The memory access request is then serviced on the target node, and corresponding data is returned to the initiator. During compute node composition, the compute nodes are configured to access disaggregated memory resources in the SCM nodes.

25 Claims, 18 Drawing Sheets

(51) Int. Cl.
*H04L 12/911* (2013.01)
*H04L 12/931* (2013.01)
*G06F 3/06* (2006.01)
*G06F 12/00* (2006.01)

(52) U.S. Cl.
CPC .............. *H04L 47/70* (2013.01); *H04L 49/00*
(2013.01); *H04L 67/02* (2013.01)

(56) References Cited

U.S. PATENT DOCUMENTS

| | | | |
|---|---|---|---|
| 8,639,214 B1* | 1/2014 | Fujisaki | G06Q 20/32 379/88.03 |
| 8,848,727 B2 | 9/2014 | Saraiya et al. | |
| 2005/0195975 A1* | 9/2005 | Kawakita | H04L 9/0822 380/30 |
| 2007/0288653 A1* | 12/2007 | Sargor | H04L 29/12405 709/245 |
| 2013/0176401 A1* | 7/2013 | Monari | H04N 5/2252 348/47 |
| 2014/0359044 A1 | 12/2014 | Davis et al. | |
| 2015/0103826 A1 | 4/2015 | Davis et al. | |
| 2015/0180790 A1 | 6/2015 | Rimmer et al. | |
| 2015/0234683 A1* | 8/2015 | Ogasawara | G06F 9/5016 711/163 |
| 2015/0370732 A1* | 12/2015 | Tanimoto | G06F 13/14 711/148 |
| 2016/0210076 A1 | 7/2016 | Frank et al. | |
| 2016/0277497 A1* | 9/2016 | Bannister | H04L 67/1097 |
| 2017/0177520 A1* | 6/2017 | Kampe | G06F 13/28 |
| 2018/0077235 A1* | 3/2018 | Nachimuthu | H04L 47/70 |
| 2018/0189081 A1* | 7/2018 | Upasani | G06F 9/44521 |
| 2018/0192540 A1* | 7/2018 | Kumar | H05K 7/1492 |

\* cited by examiner

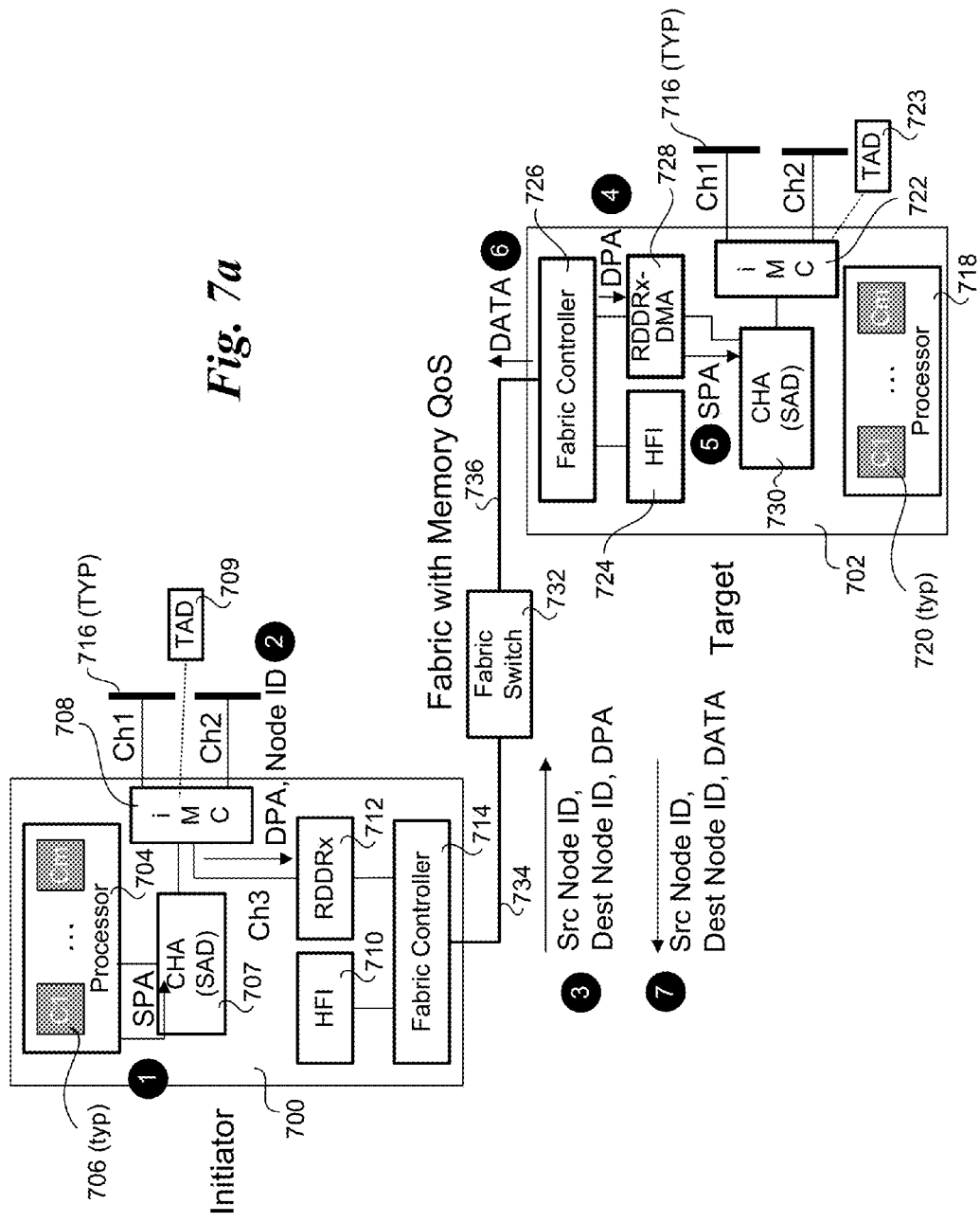

SPA
System
Physical
Address

Channel ID
DIMM ID
DPA (Device Physical Address)

SPA
System
Physical
Address

Node ID (on Fabric)
DPA (Device Physical Address)

Unique TAD per each remote node

| Channel ID# | DIMM ID# | Node ID# (look-up) |
|---|---|---|
| 0 | 0 | 10 |
| 0 | 1 | 11 |
| 1 | 0 | 14 |
| 1 | 1 | 23 |
| 2 | 0 | 22 |
| 2 | 1 | 21 |

*Fig. 13*

| OpCode | Data Repeat Count | Data Bytes |
|---|---|---|
| 0 – Byte pattern repeat | | 1 |
| 1 – Word pattern repeat | | 2 |
| 2 – Dword pattern repeat | | 3 |
| 3 – Qword pattern repeat | | 4 |
| 4 – compression logic x – length n | | n |
| 5 – compression logic y – length m | | m |

*Fig. 16*

MECHANISM FOR DISAGGREGATED STORAGE CLASS MEMORY OVER FABRIC

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categorized as Software as a Service (SaaS), Platform as a Service (PaaS), and Infrastructure as a Service (IaaS). SaaS services, also commonly called Web services and cloud application services, enable access to services running on datacenter servers via a network connection and client-side interface, such as a Web browser. Well-known examples of SaaS services include e-mail Web services (e.g., Google gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchases IaaS based on consumption. For example, AWS and Windows Azure respectively offer use of Amazon and Microsoft datacenter resources on a resource allocation/consumption basis. Amazon Elastic Compute Cloud (EC2) is a central part of AWS.

IaaS usage for a given customer typically involves allocation of data center resources. For example, a typical AWS user may request use of one of 24 different EC2 instances, which range from a t2.nano instance with 0.5 Gigabyte (GB) of memory, 1 core/variable cores/compute units and no instance storage to an hs1.8xlarge with 117 GB of memory, 16/35 cores/compute units and 48000 GB of instance storage. Each allocated EC2 instance consumes certain physical datacenter resources (e.g. compute, memory storage). At the same time, datacenter racks may support a multitude of different configurations. To maximum resource allocation, the IaaS operator needs to track what resources are available in which rack.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7a further adds a message and data flow corresponding to an exemplary memory access request to the diagram of FIG. 7;

FIG. 13 is an exemplary fabric node ID lookup table; and

FIG. 16 is a table illustrating an exemplary set of OpCodes and associated fields for implementing data compression, according to one embodiment.

DETAILED DESCRIPTION

Figure 1:
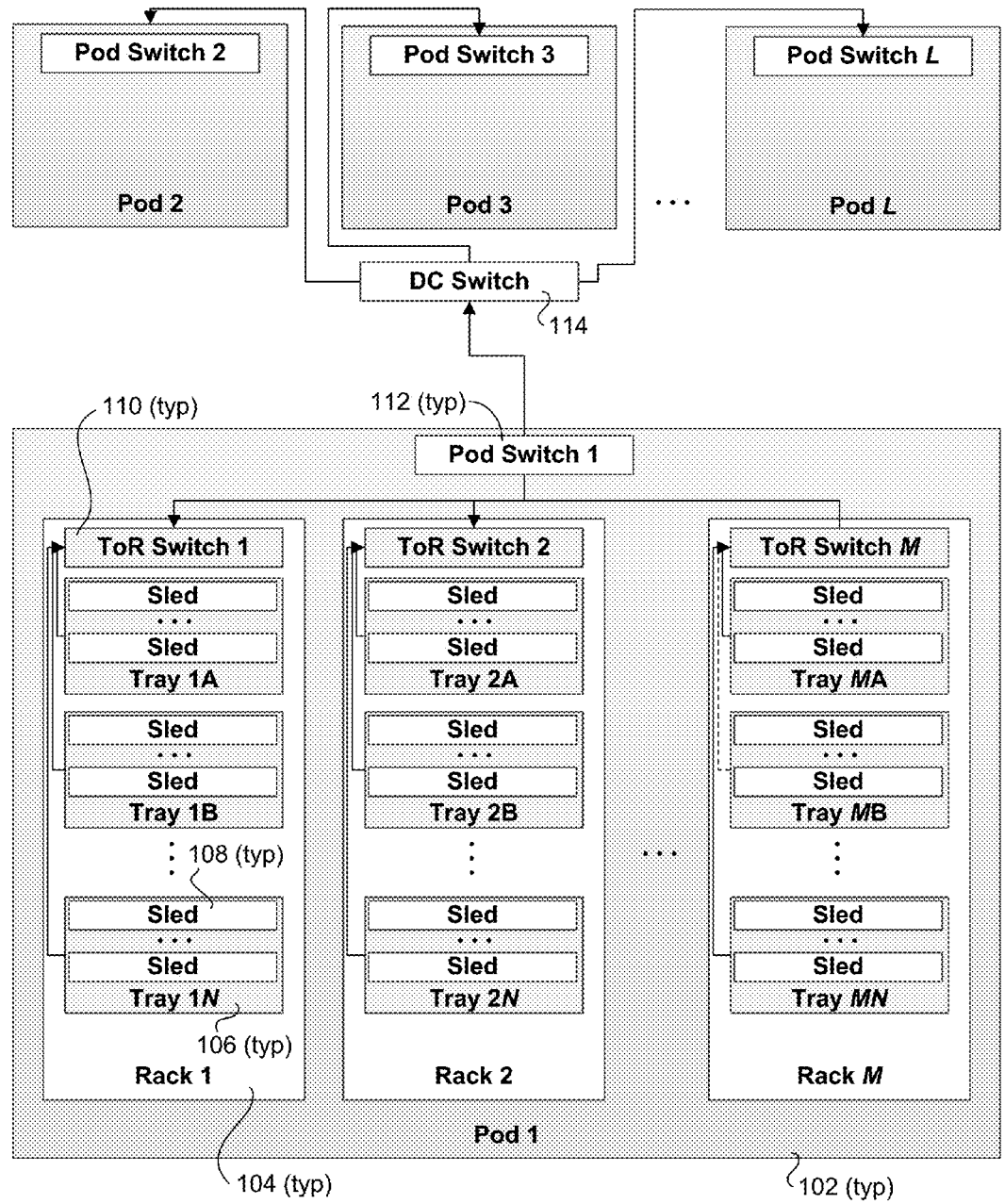
FIG. 1 is a schematic diagram of a conventional physical rack configuration in a data center.

Embodiments of mechanisms for disaggregated storage class memory over fabric and associated methods, apparatus, and systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation introduced new rack architecture called Rack Scale Design (RSD) (formerly called Rack Scale Architecture). Rack Scale Design is a logical architecture that disaggregates compute, storage, and network resources and introduces the ability to pool these resources for more efficient utilization of assets. It simplifies resource management and provides the ability to dynamically compose resources based on workload-specific demands.

RSD uses compute, fabric, storage, and management modules that work together to enable selectable configuration of a wide range of virtual systems. The design uses four basic pillars, which can be configured based on the user needs. These include 1) a Pod Manager (PODM) for multi-rack management, comprising firmware and software Application Program Interfaces (APIs) that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
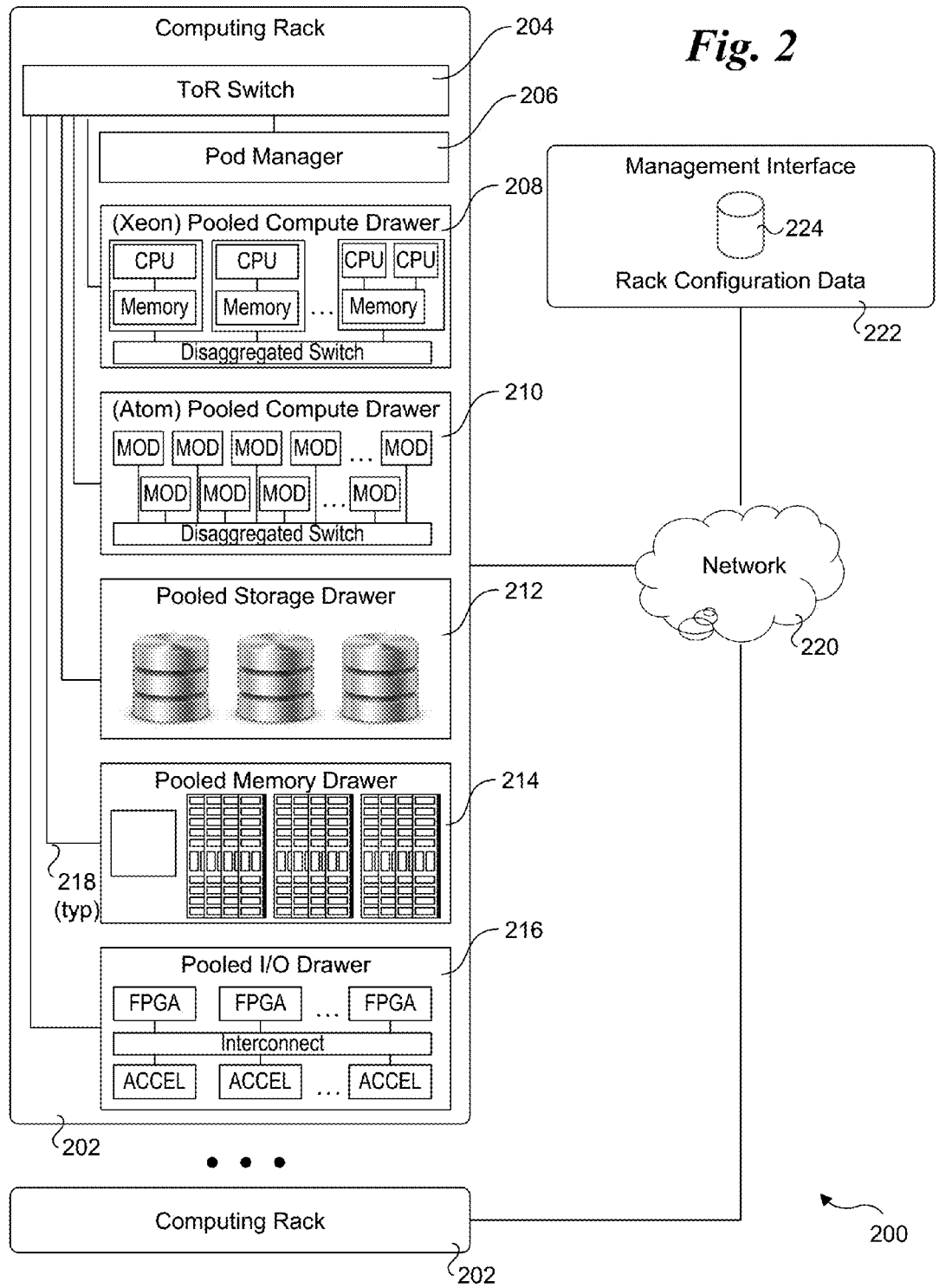
FIG. 2 is a schematic diagram of a Rack Scale Design (RSD) configuration in a data center, according to one embodiment.

An exemplary RSD environment 200 is illustrated in FIG. 2. RSD environment 200 includes multiple computing racks 202, each including a Top of Rack (ToR) switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 208, and INTEL® ATOM® pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+ Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSD environment 200 further includes a management interface 222 that is used to manage various aspects of the RSD environment. This includes managing rack configuration, with corresponding parameters stored as rack configuration data 224.

Figure 3:
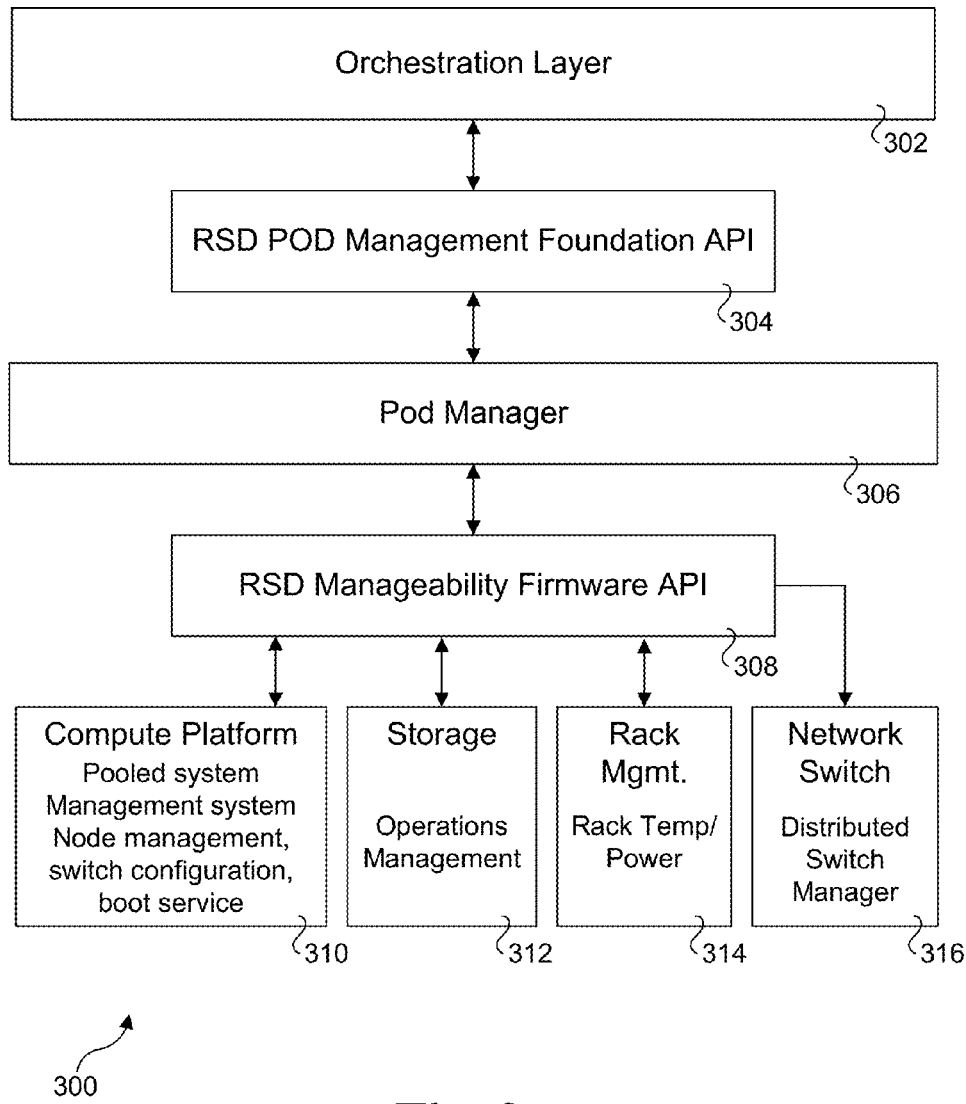
FIG. 3 is a block diagram of an RSD management architecture, according to one embodiment

FIG. 3 shows one embodiment of an RSD management architecture 300. The RSD management architecture includes multiple software and firmware components configured in a layered architecture including an orchestration layer 302, an RSD pod management foundation API (Application Program Interface), a pod manager 306, and an RSD manageability firmware API 308. The bottom layer of RSD management architecture includes a compute platform management component 310, a storage management component 312, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

INTEL® Rack Scale Design is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSD terminology) manager called a Pooled System Management Engine (PSME). The management elements of RSD, RMM and PSMEs are connected to a private network that is not accessible external to the rack, as shown in FIG. 4 and discussed below.

Figure 4:
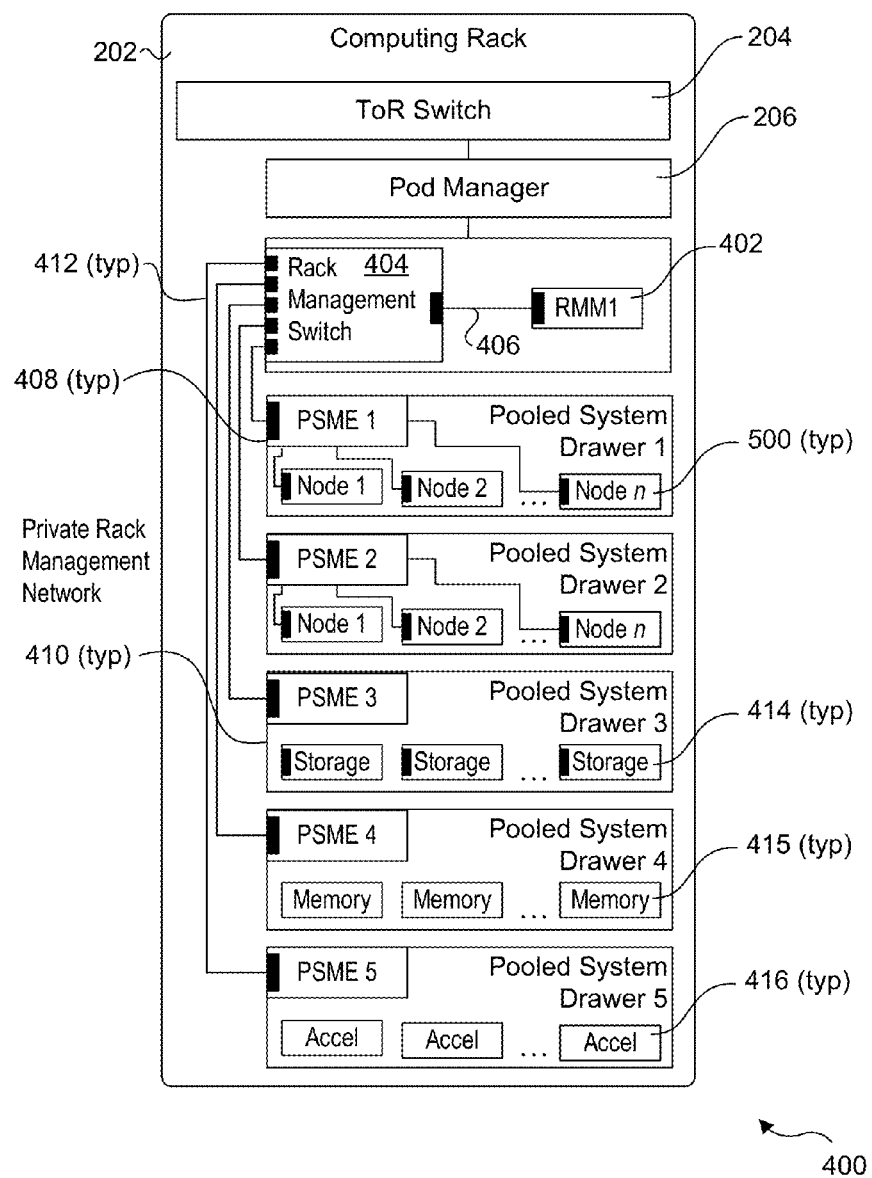
FIG. 4 is a schematic diagram showing further details of an RSD rack implementing Pooled System Management Engines (PSMEs)

FIG. 4 shows one embodiment of a rack configuration 400 employing rack management and configuration components that communicate over a private rack management network. The rack management and configuration components include an RMM 402 coupled in communication with a rack management switch 404 via a link 406. A respective PSME 408 is associated with each of five pooled system drawers 410. Each PSME 408 is connected to rack management switch 404 via a link 412. The rack management switch is also connected to POD Manager 206. In the illustrated embodiment, each of pooled system drawers 1 and 2 includes a plurality of compute nodes 500, while pooled system drawers 3, 4, and 5 respective include a plurality of storage resources 414, a plurality of memory resources 415, and a plurality of IO accelerator resources 416.

In a datacenter environment such as RSD, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

Current enterprise/cloud computer systems have volatile memory, for example DRAM (Dynamic Random Access Memory) memory, and storage class non-volatile memory such as 3D crosspoint (3D XPOINT™) technology DIMMs (Dual In-line Memory Modules), which are populated locally within the compute node. Other types of memory may also be used.

Non-volatile memory is a storage medium that does not require power to maintain the state of data stored by the medium. Non-limiting examples of nonvolatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module 122 is synchronous dynamic random access memory (SDRAM). In particular embodiments, DRAM of the memory modules 122 complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices 106 that implement such standards may be referred to as DDR-based interfaces.

Storage-class memory (SCM) combines the benefits of a solid-state memory, such as high performance and robustness, with the archival capabilities and low cost of conventional hard-disk magnetic storage. SCM is a new hybrid storage/memory tier with unique characteristics. It's not exactly memory, and it's not exactly storage. Physically, it connects to memory slots in a motherboard, like traditional DRAM. While SCM is slightly slower than DRAM, it is persistent, meaning that, like traditional storage, its content is preserved during a power cycle. Compared to flash, SCM is orders of magnitude faster, providing performance gains on both read and write operations. It has another benefit over flash as well—SCM tiers are significantly more resilient, not suffering from the wear that flash falls victim to.

Generally, SCM can be addressed at either the byte or block level, depending on the particular implementation. This gives operating systems, software and hypervisor developers significant flexibility regarding the medium's applications. For example, it's conceivable that operating systems will initially treat SCM as block storage devices formatted by file systems and databases for compatibility purposes. However, next-generation applications may choose to access SCM directly via memory-mapped files using byte-level addressing. Hypervisors can abstract and present isolated SCM regions directly to different VMs as either execution memory or a flash-like storage resource.

The Rack Scale system uses these compute nodes and storage nodes (Non-volatile memory, SATA and NVM Express (NMVe) storage devices, etc.) to compose a system based on user needs. Here if a user wants a certain amount of storage class memory, the POD Manager scans all the compute nodes in the rack and selects a best fit compute node that contains the user requested storage class memory and provides it to the user. Currently storage class memory disaggregation is not available. Hence the Rack Scale environment currently ends up using virtualization to create requested user requested configuration using larges amount of local storage memory, which is not performance/TCO effective on most cases.

To address this problem, embodiments herein provide a mechanism for disaggregated storage class memory over a low latency fabric. Under this approach, compute nodes may be composed to include memory resources that are in separate (from the compute nodes' CPUs) pooled system drawers. For example, a system can be composed that combines both local memory resources within a compute drawer with remote memory resources housed in a separate memory pooled system drawer. Moreover, the system can be implemented in a manner under which the combined memory resources appear as local resources to software running on the local compute node.

Figure 5:
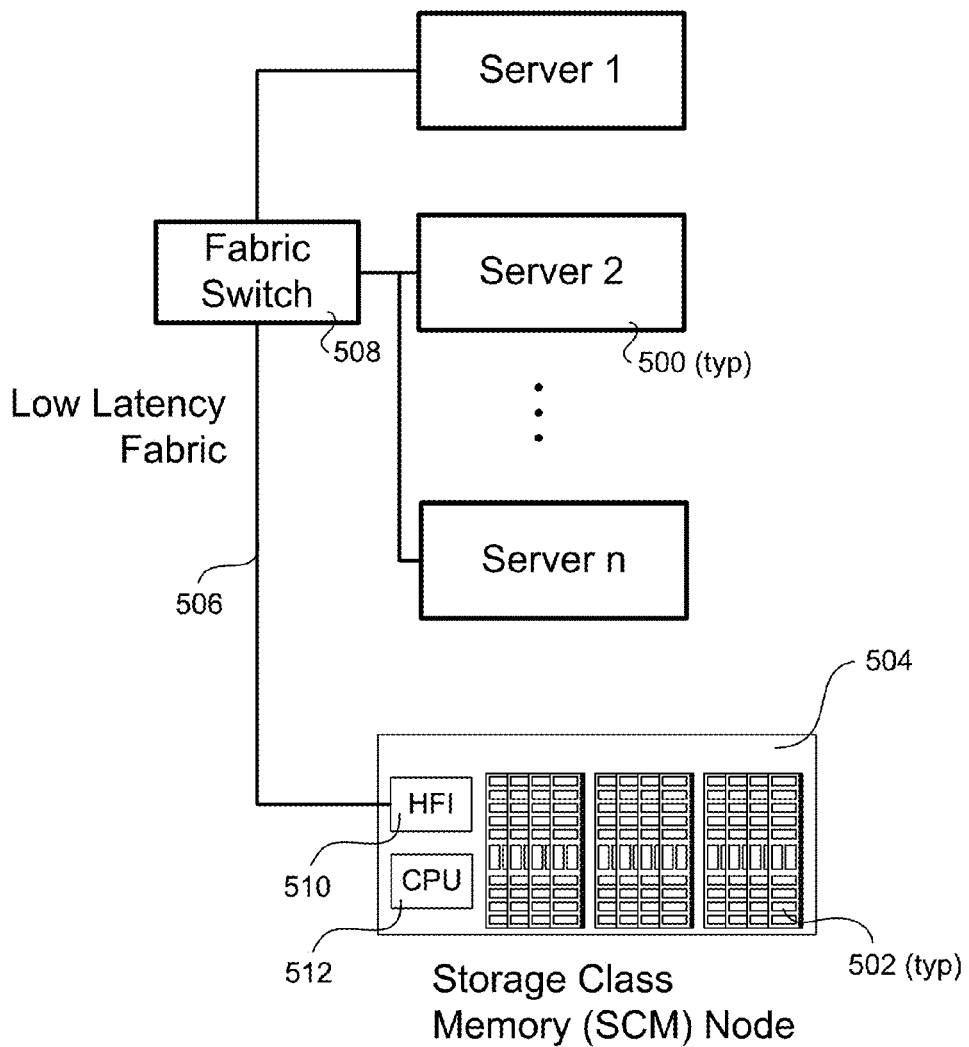
FIG. 5 is a schematic diagram illustrating an overview of a disaggregated memory access mechanism, according to one embodiment.

An overview of the concept is illustrated in FIG. 5. Under the mechanism, each of a plurality of compute nodes, such as servers 500, is enabled to access memory 502 in an SCM node 504 via a low latency fabric 506 and a fabric switch 508. In one embodiment, the low latency fabric comprises an INTEL® Omni-Path fabric, which employs the INTEL® Omni-Path Architecture (OPA). OPA employs a host fabric interface (HFI) at each fabric endpoint. SCM node 504 is an example of an OPA endpoint and includes an HFI 510. A processor 512 is also used by SCM node 504 to facilitate access to memory 502 via execution of instructions stored on the SCM node. SCM node 504 contains storage class memory devices, such as 3D XPOINT™ technology DIMMs, which are used as disaggregated storage class memory. Other types of non-volatile memory devices may also be used, as well as volatile DRAM-based DIMMS, such as DDR4 (double data rate fourth generation) and future DDR5 (fifth generation) DIMMs or in combinations or other type of byte accessible memory DIMMs. Generally, an SCM node may comprise a pooled system memory drawer, or multiple SCM nodes may be installed in a pooled system memory drawer.

Figure 6:
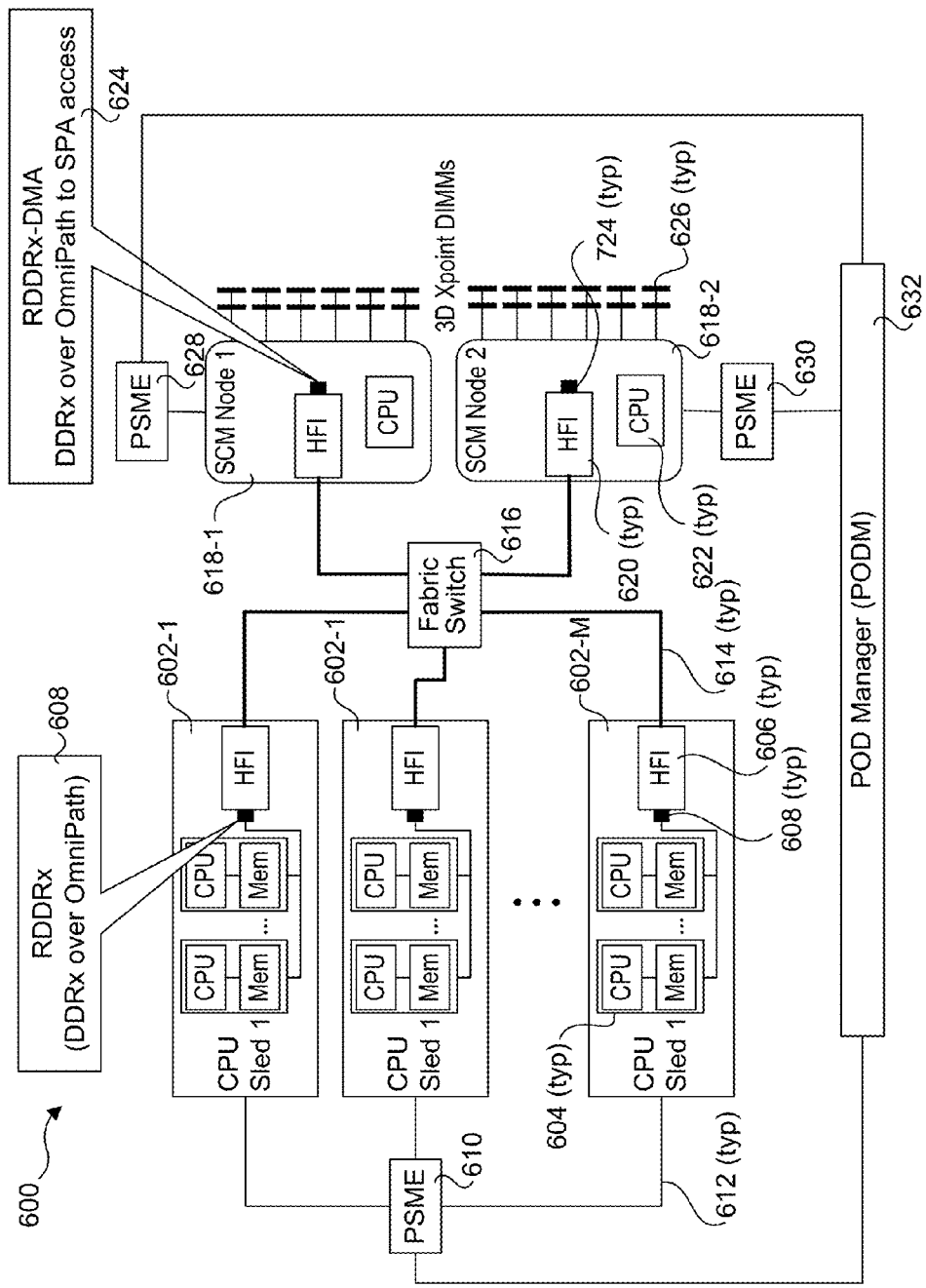
FIG. 6 is a schematic diagram an exemplary disaggregated SCM memory architecture corresponding to one embodiment of an implementation under an RSD environment.

An exemplary disaggregated SCM memory architecture 600 corresponding to one embodiment of an implementation under an RSD environment is shown in FIG. 6. SCM memory architecture 600 includes a plurality of CPU sleds 602-1-602-M, also labeled Sled 1-Sled M. Each CPU sled 602 includes one or more compute nodes 604 including one or more CPUs and memory that is coupled to an HFI 606 via a Remote DDR-based (referred to herein as RDDRx) engine 608. As used herein, "DDRx" refers to any existing and future DDR-based memory interface and/or protocol defined by a current or future DDR standard or otherwise using DDR-based technology, whether standardized or not, including Joint Electron Device Engineering Council (JEDEC) DDR-based standards. Each CPU sled 602 is connected to a PSME 610 via a high speed link 612, such as a high speed Ethernet link or SiPh optical link.

Each of HFIs 606 is connected to an OPA fabric including a plurality of fabric links 614 and a fabric switch 616. The OPA fabric facilitates high-speed, low-latency communication between compute nodes 604 and a pair of SCM nodes 618-1 and 618-2. Each of SCM nodes 618-1 and 618-2 includes an HFI 620, a CPU 622, and RDDRx-DMA (Direct Memory Access) engine 624, and a plurality of 3D XPOINT™ technology DIMMs 626. Each of SCM nodes 618-1 and 618-2 is also connection to a respective PSME 628 and 630. Each of PSMEs 610, 628 and 630 is connected to a POD Manager (PODM) 632. In addition to using 3D XPOINT™ technology DIMMs 626, other types of memory devices using various types of protocols may also be used, including DRAM-based devices, NVMe devices, or other type of byte accessible memory devices, or a combination of such memory devices.

CPU 622 is representative of various types of processing elements, including processors, microcontrollers, etc., and the term "CPU" does not limit this component to a central processor unit. CPU 622 is used for initializing memory using normal memory reference code. As a result, the SCM nodes shown herein could employ a microcontroller any other component capable of initializing the memory.

Figure 7:
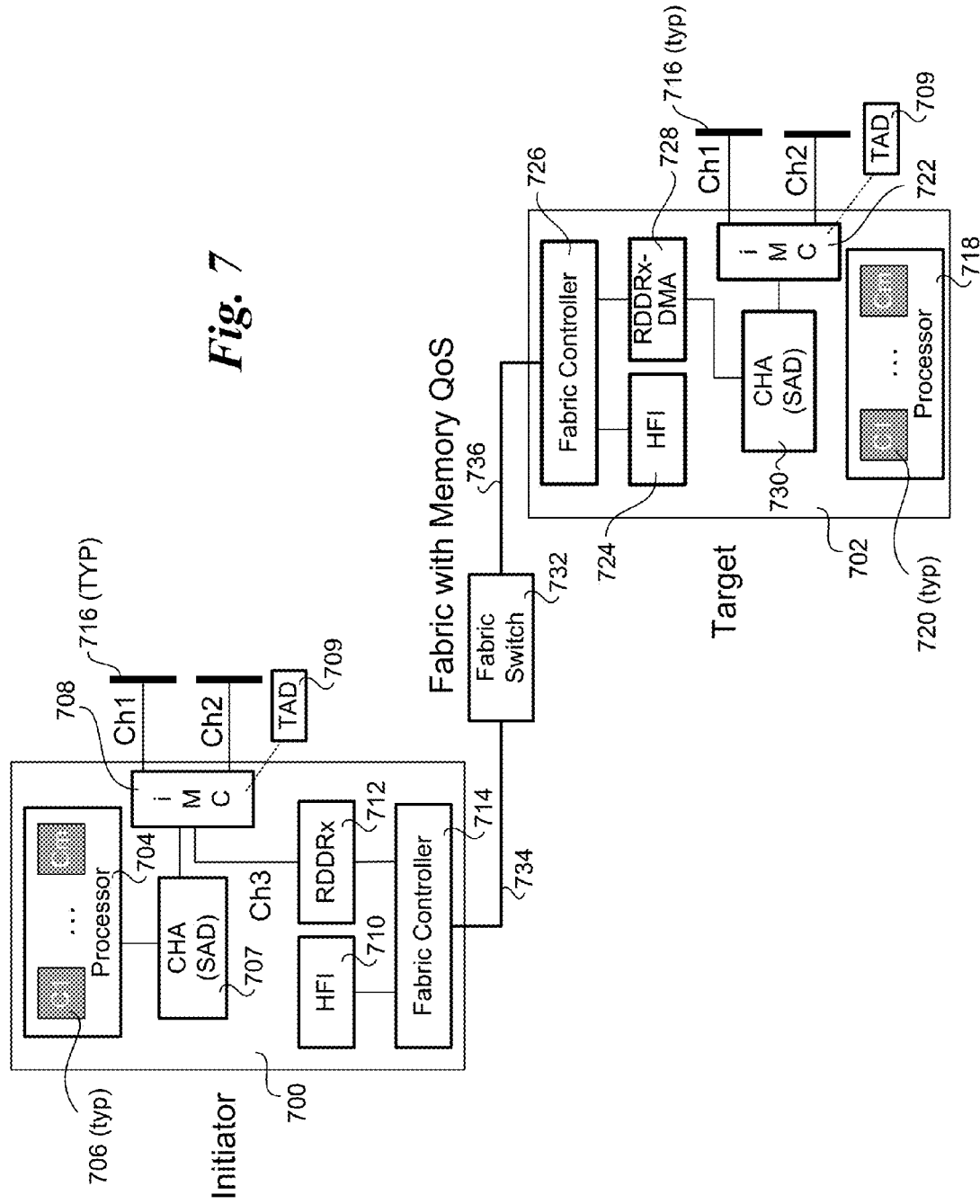
FIG. 7 is a schematic diagram illustrating an initiator that is configured to access both local memory and disaggregated memory coupled to a target.

FIG. 7 shows one embodiment of an initiator 700 comprising a compute node that is configured to access both local memory and disaggregated memory coupled to a target 702 comprising an SCM node. Initiator 700 includes a processor 704 having a plurality of processor cores 706, a caching agent (CHA) 707 with SAD (Source Address Decode) logic, an integrated memory controller (iMC) 708 including TAD (Target Address Decode) logic 709, an HFI 710, an RDDRx engine 712, and a fabric controller 714. iMC 708 is coupled to memory devices 716 via one or more channels, such as depicted by Channels 1 and 2 (Ch1 and Ch2). iMC 708 is also connected internally to RDDRx engine 712 via a third channel Ch3.

As with initiator 700, target 702 includes a processor 718 including a plurality of processor cores 720, an iMC 722 with TAD logic 723, an HFI 724, and a fabric controller 726. Target 702 further includes a RDDRx-DMA engine 728 and a caching agent 730 with SAD. iMC 708 is coupled to memory devices 716 via one or more channels, as depicted by Ch1 and Ch2. FIG. 7 further shows fabric controller 714 connected to a fabric switch 732 via a fabric link 734, and fabric controller 726 connected to fabric switch 732 via a fabric link 736.

As with CPU 622 above, processor 718 is representative of various types of processing components that are capable of performing memory initialization, including a processor with one or more cores, microcontrollers, and other suitable components.

Figure 7B:
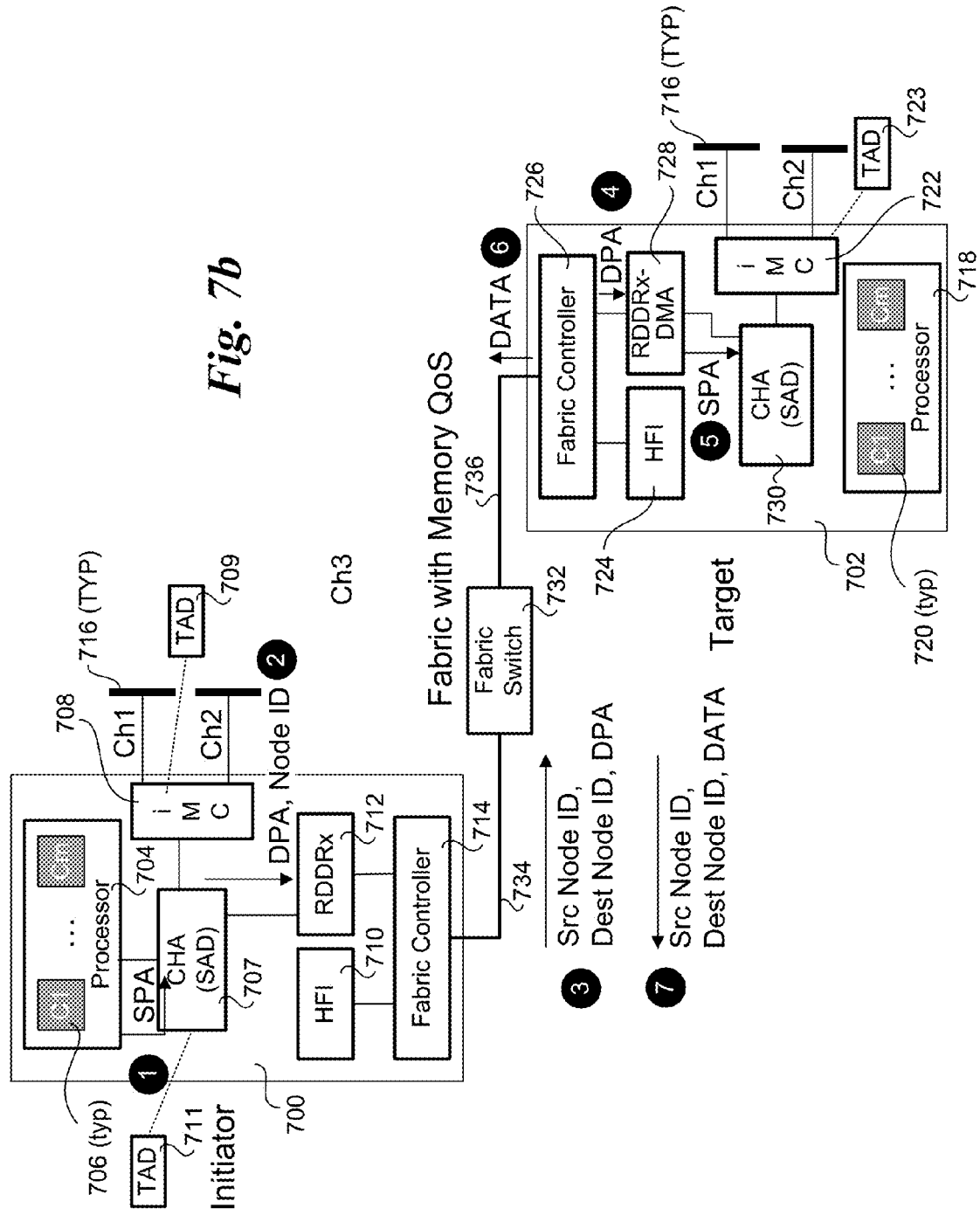
FIG. 7b illustrates an alternative configuration to FIG. 7a under which a local integrated memory controller (iMC) is bypassed for memory access request that access memory on a remote target node.
Figure 8A:
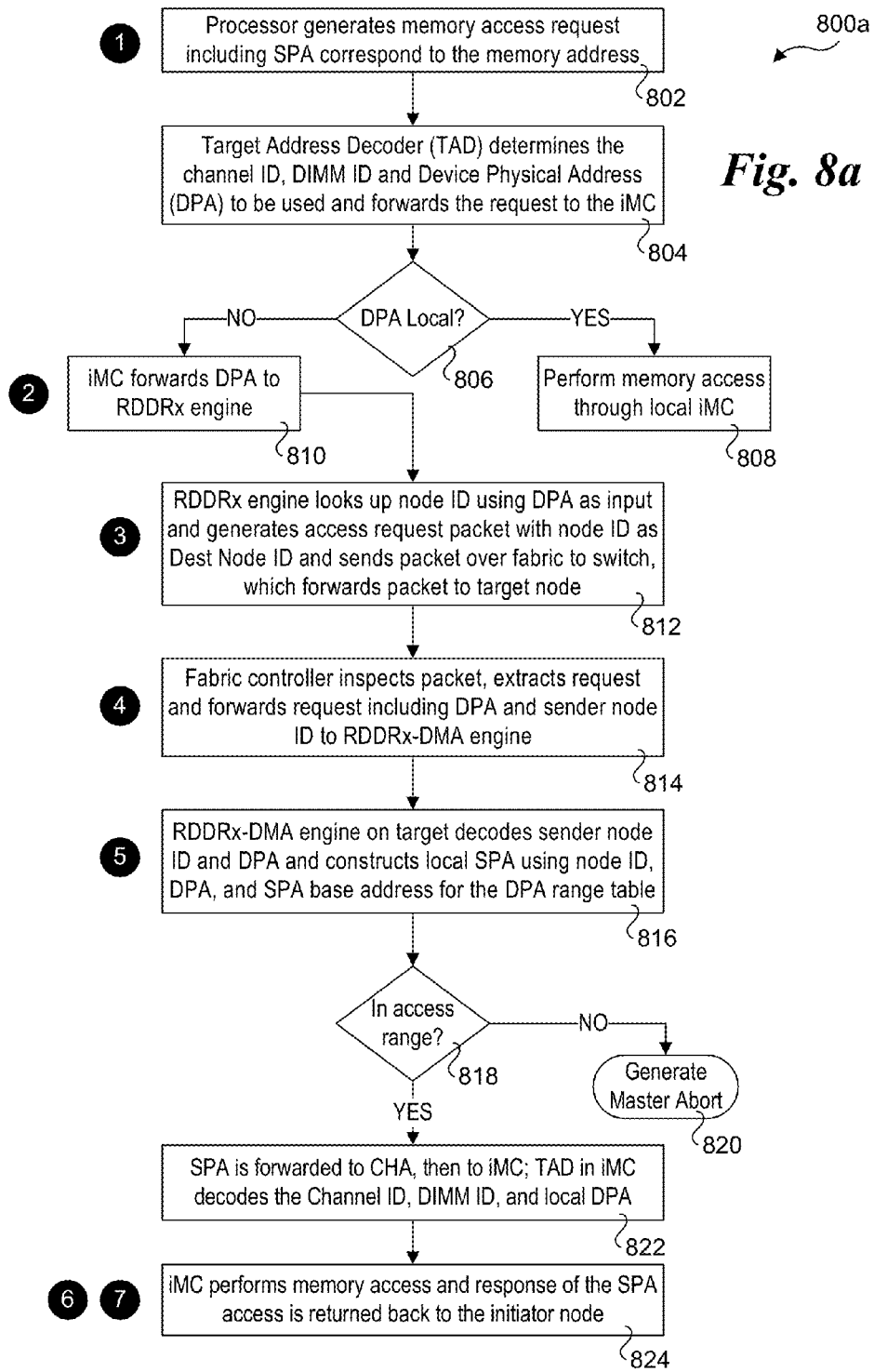
FIG. 8a is a flowchart illustrating operations and logic performed by the initiator and target of FIGS. 7 and 7a when accessing local memory and remote disaggregated memory attached to the target.

FIG. 8a shows a flowchart 800a illustrating operations and logic performed by initiator 700 when accessing local memory and remote disaggregated memory attached to target 702, while corresponding message and data flows are illustrated in FIG. 7a. The process begins in a block 802 with a first operation '1' (each operation is illustrated by an encircled number in FIGS. 7a, 7b, 8a and 8b) under which processor 704 initiates (via execution of software running on the processor) a memory access request that includes a System Physical Address (SPA) corresponding to a memory address to be accessed. Generally, the memory access request may be initiated via an operating system or an application running on an application.

Figure 9A:
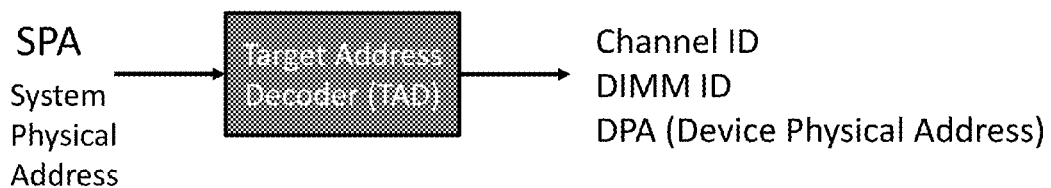
FIG. 9a is a diagram illustrating one embodiment an SPA-to-DPA conversion that outputs a channel ID, DIMM ID, and device physical address.

The memory access request is forwarded to CHA 707, which forwards the request including the SPA to iMC 708. The iMC employs its TAD logic to determine a channel identifier (ID), DIMM ID, and Device Physical Address (DPA) corresponding to the SPA to be used to access the memory, as depicted in a block 804. A range of storage class memory allocated for each compute node is viewed as a DPA range within a DIMM. The TAD contains the translation of SPA-to-DPA, along with the channel ID and DIMM ID. One embodiment of this SPA-to-DPA conversion is illustrated in FIG. 9a. Generally, data used for mapping SPA ranges to channel IDs, DIMM IDs, and DPAs may be stored in a lookup table or similar type of data structure and will have been previously configured, as described below in further detail.

Next, in a decision block 806 the iMC determines whether the DPA corresponds to a local memory resource (i.e., the memory is physically located in a memory attached to the iMC). In one embodiment, the iMC has information that identifies the physical address ranges of its attached memory devices, with each DIMM having a respective DPA range. Optionally, or in addition, the iMC can inspect the channel ID and/or DIMM ID and determine whether it correspond to a channel and/or DIMM connected to the iMC. If the answer to decision block 806 is YES, the memory access is performed through the local iMC to service the memory access request in the conventional manner, as depicted in a block 808.

Figure 10:
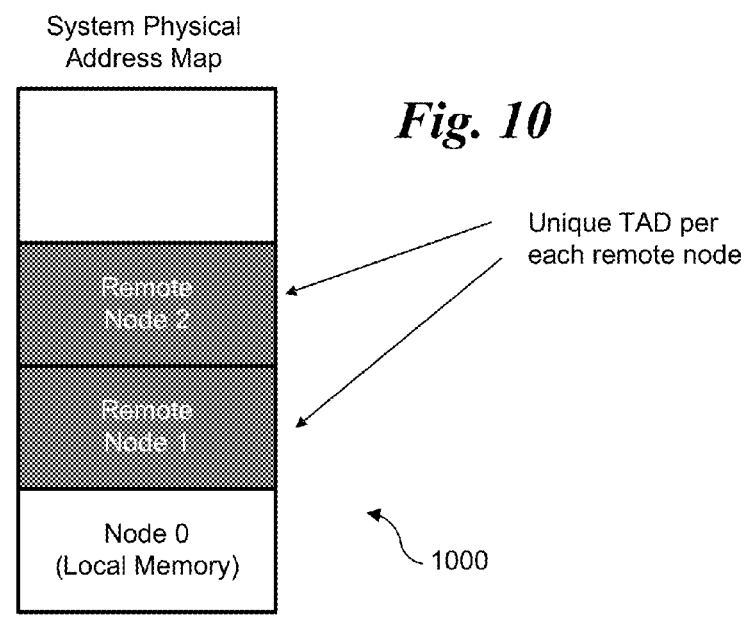
FIG. 10 is a diagram illustrating an exemplary system physical address map including multiple remote nodes used to access disaggregated memory.

If the DPA corresponds to a memory address in disaggregated memory, the answer to decision block 806 will be NO, and the logic will proceed to a block 810 in which the iMC forwards the DPA to the RDDRx engine, as illustrated by operation '2' shown in FIG. 7a. In a block 812, the RDDRx engine looks up the fabric node ID corresponding to the SCM node that hosts a memory device corresponding to the DPA, and generates an access request with the fabric node ID as the destination fabric node ID in the packet header and sends the access request packet onto the fabric toward the fabric switch. In one embodiment, the fabric node ID is identified using a lookup table that maps DPA ranges to fabric node IDs. For example, such a lookup table is schematically illustrated in FIG. 10 as a system physical address map 1000 that maps SPA ranges to fabric node IDs. As further shown, each remote node has a unique TAD.

As depicted by operation '3', the access request packet includes a source (Src) fabric node ID, the determined destination (Dest) fabric node ID, and the DPA. In accordance with the operations of most fabrics, the source and destination fabric node IDs are used for forwarding packets between nodes interconnected via the fabric using conventional packet forwarding schemes. Such a conventional packet forwarding operation is depicted in FIG. 7a with the access request packet being is received by the fabric switch (732) and forwarded to the target node (target 702).

Figure 11:
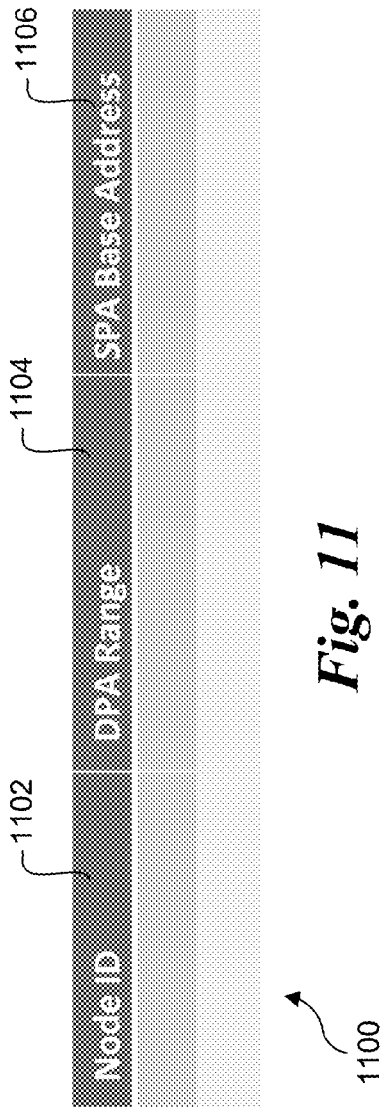
FIG. 11 is and exemplary DPA range table.

Upon receiving the access request packet, the fabric controller (726) inspects the packet, extracts the request including the DPA and sender fabric node ID, and forwards the request to the RDDRx-DMA engine, as depicted by a block 814 in FIG. 8a and operation '4' in FIG. 7a. In a block 816, the RDDRx-DMA engine decodes the sender fabric node ID and DPA and constructs a local SPA using the sender fabric node ID, DPA, and SPA base address for a DPA range table. An exemplary DPA range table 1100 is shown in FIG. 11, and includes a Sender (Fabric) Node ID column 1102, a DPA column 1104, and an SPA base address column 1106.

Figure 12:
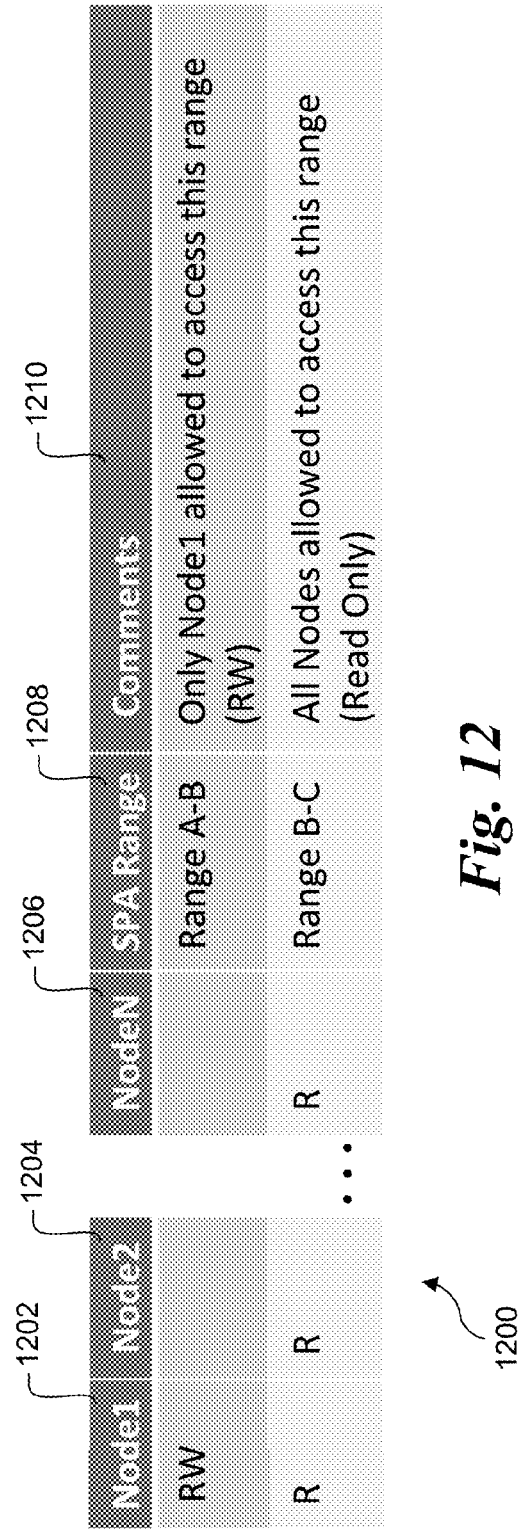
FIG. 12 is an exemplary access permission lookup table.

In a decision block 818, the RDDRx-DMA engine verifies if the sender fabric node ID and DPA range are in the access permission range. In one embodiment, access permission ranges are stored in a lookup table, such as depicted by an access permission lookup table 1200 in FIG. 12. The access permission lookup table includes a column for each node, as depicted by columns 1202, 1204 and 1206, as well as an SPA range column 1208 and an optional comments column 1210. In access permission lookup table 1200, 'RW' means Read Write, and 'R' means read, wherein RW and R entries correspond to allowed access permissions for each SPA range defined in SPA range column 1208. As illustrated by the Comments column, the entry in the first row defines an access permission under which only Node1 can access memory within the SPA range A-B, and both Read and Write access is permitted. As depicted in the second row, Read only access for SPA range B-C is allowed for each of the nodes.

If the SPA does not fall within a permitted access range and corresponding access type (i.e., Read or Write), the answer to decision block 818 is NO, and the logic proceeds to an end block 820 in which a master abort is generated. In one embodiment, Writes are dropped, while Reads return all 1s. If the SPA falls within the permitted range and access type, the answer to decision block 818 is YES, and the logic proceeds to a block 822, wherein the SPA is forwarded to the CHA on the target. The CHA then forwards the SPA to the iMC on the target. In a manner similar to discussed above, the TAD logic in the iMC decodes the channel ID, DIMM ID and a local (to the target node) DPA.

In a block 824, in response to receiving the memory access request, the iMC uses the channel ID and/or DIMM ID determined by its DPA logic and accesses the memory location at a physical address defined by the local DPA to service the memory access request. This is functionally similar to the conventional local iMC memory access referred to above in block 808, except it is occurring on a remote node. The response of the SPA memory access is then returned back to the initiator node in a SPA response packet. As depicted at operations '6' and '7,' the response will include the response DATA and is sent over the fabric using a packet that includes the target node as the source fabric node ID and the initiator node as the destination fabric node ID. For a Read request, the response DATA will include the data read from memory at the requested SPA. For a Write request, the response DATA may include indicia indicating whether the Write was completed successfully.

The SPA response packet is received by the fabric controller (714) of the initiator (712), and it is forwarded through the initiator's RDDRx engine, iMC, and CHA to return the DATA to the processor. From the perspective of the processor (and software running on the processor), the DATA corresponding to the memory access appears to be have been retrieved from local memory rather than remote memory.

Figure 8B:
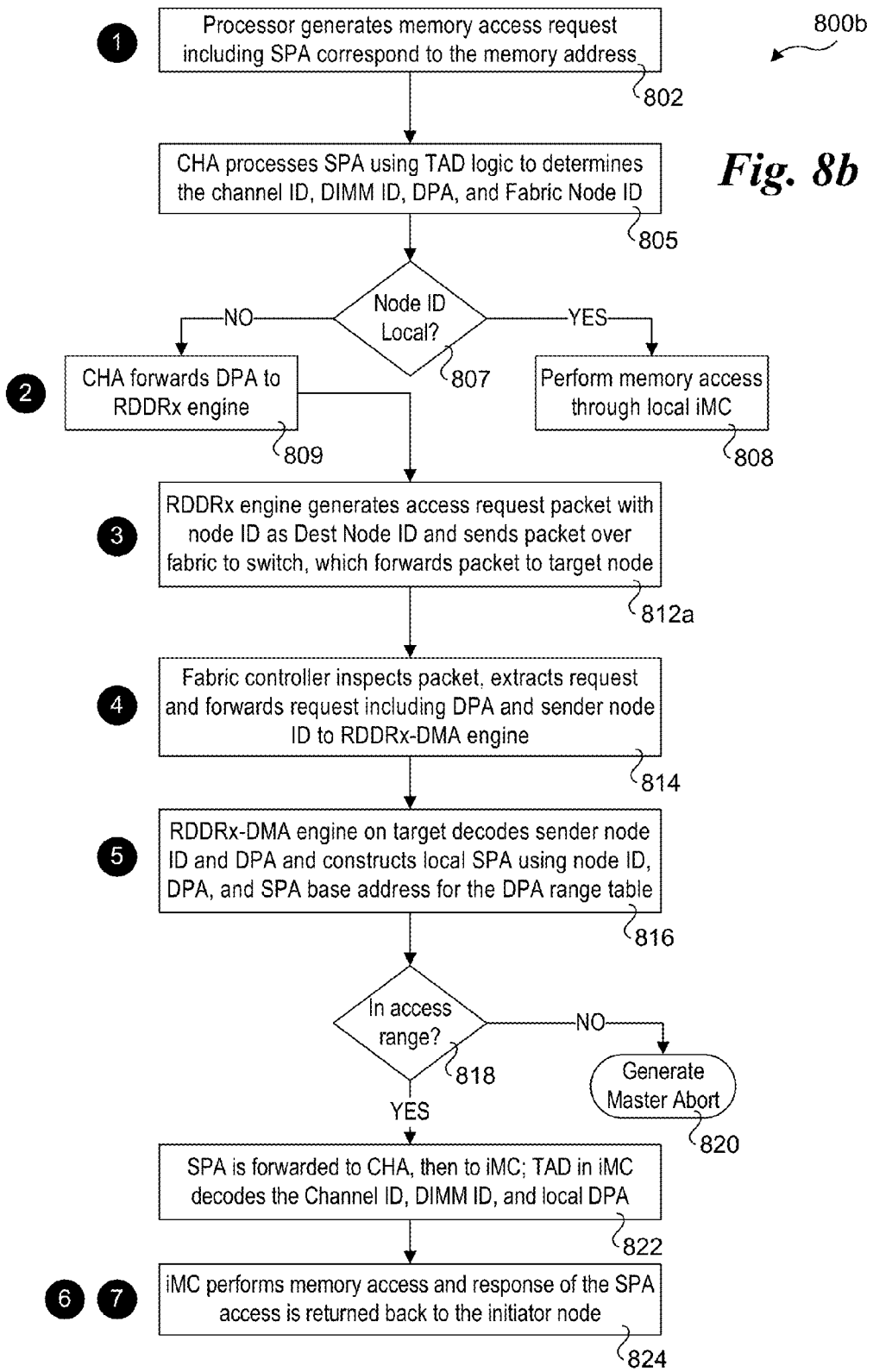
FIG. 8b is a flowchart illustrating operations and logic performed by the initiator and target of FIG. 7b when accessing local memory and remote disaggregated memory attached to the target.

An alternative implementation is shown in a flowchart 800b of FIG. 8b and FIG. 7b. In flowcharts 800a and 800b, like-numbered blocks perform similar operations and, as such, only the differences between flowcharts 800a and 800b are described herein. As shown in FIG. 7b, CHA 707 further includes TAD logic 711.

Figure 9B:
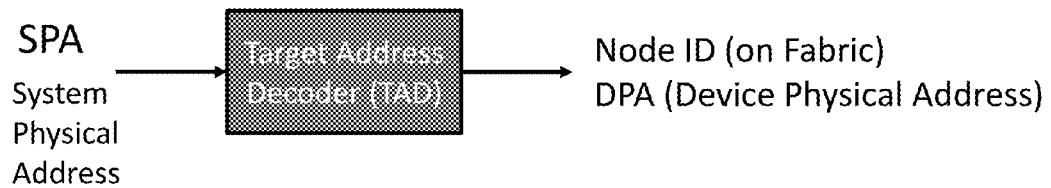
FIG. 9b is a diagram illustrating an embodiment an SPA-to-DPA conversion to outputs a fabric node ID.

Under the implementation of flowchart 800b and FIG. 8b, in a block 805 the CHA receives the SPA and employs TAD logic 711 to generate the channel ID, DIMM ID, DPA and fabric node ID of the fabric endpoint to be used to service the memory request. In one embodiment, determining the fabric node ID is similar to the operation described above that is performed by the RDDRx engine in block 812, with the input and output illustrated in FIG. 9b. In one embodiment, the TAD 711 includes a fabric node ID lookup table 1300 as shown in FIG. 13. The fabric node ID lookup table includes a Channel ID# column 1302, a DIMM ID# column 1304, and a fabric node ID# lookup column 1306. Based on the channel ID and the DIMM ID numbers, the fabric node ID number can be identified via the fabric node ID table lookup.

In a decision block 807 a determination is made to whether the fabric node ID is local (is the fabric node ID for the initiator) or corresponds to a remote node. If the fabric node ID is local, the answer to decision block 807 is YES, and the channel ID, DIMM ID, and DPA are forwarded to the local iMC, which performs a memory access in block 808 in a similar manner to that described above.

If the fabric node ID corresponds to a remote node, the answer to decision block 807 is NO, and the logic proceeds to a block 809 in which the CHA forwards the DPA to the RDDRx engine. In a block 812a, the RRDRT engine generates an access request packet with the fabric node ID as the destination fabric node ID and sends the packet over the fabric to the fabric switch, which forwards the packet to the target fabric node identified by the destination fabric node ID in a manner similar to that described above for block 812.

As another alternative, the combination of the operations in blocks 805 and 807 could merely determine whether the memory access was to a local node or not, without identifying the particular destination node, wherein a memory access request for the local node would be sent to the local iMC with the channel ID, DIMM ID, and DPA, while a memory access request for a remote node would sent the DPA (with optional channel ID and DIMM ID) to the RDDRx engine, which would perform the operation of block 812.

Another aspect of the disaggregated memory access mechanism is configuration of the various SCM nodes and memory resources, as well as allocation of such memory resources to compute nodes in response to user resource requests. In one embodiment, PSMEs are attached to compute nodes and SCM nodes, such as illustrated in FIG. 6 and discussed above. The PSMEs are responsible for getting the disaggregated memory configuration request from the PODM and configuring the SCM node and compute node parameters and populating the lookup tables.

Figure 14:
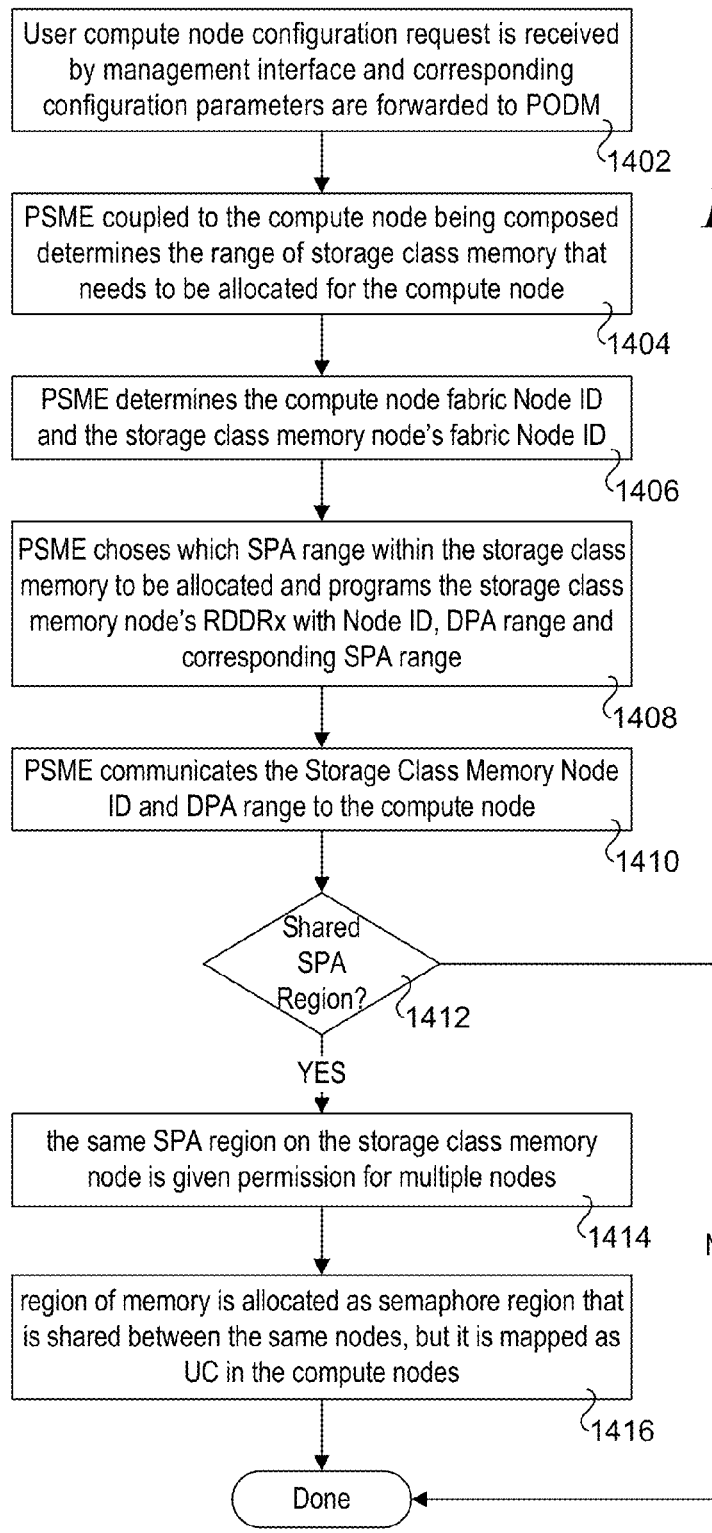
FIG. 14 is a flowchart illustrating operations and logic for performing compute node composition including allocation of disaggregated memory, according to one embodiment.

FIG. 14 shows a flowchart 1400 illustrating operations and logic for performing compute node composition including allocation of disaggregated memory, according to one embodiment. The process begins in a block 1402, wherein a user compute node configuration request is received by a management interface and corresponding configuration parameters are forwarded to the PODM. For example, a user may request a particular combination of compute, storage, and storage-class memory resources. The PODM is then responsible for composing a compute node using available RSD resources.

In a block 1404, based on the PODM input, the PSME coupled to the compute node being composed determines the range of storage class memory that needs to be allocated for the compute node. In a block 1406, the PSME determines the compute node's fabric node number (fabric node ID) and the storage class memory node's fabric node number (fabric node ID). In a block 1408, the PSME choses which SPA range within the storage class memory to be allocated and programs the storage class memory node's RDDRx engine with fabric node ID, DPA range and corresponding SPA range.

Next, in a block 1410 the PSME communicates the Storage Class Memory node ID and DPA range to the compute node. In one embodiment, the BIOS running on the compute node retrieves this information (aka virtual SPD information) and configures the compute node's RDDRx engine, CHA, and/or iMC (depending on the particular implementation scheme discussed above with reference to FIGS. 7a, 7b, 8a and 8b).

In a decision block 1412 a determination is made to whether the storage class memory could be shared between multiple compute nodes. If the answer is YES, the logic proceeds to a block 1414 in which the same SPA region on the storage class memory node is given permission for multiple nodes.

If the storage class memory region is shared between multiple compute nodes, then a region of memory is allocated as semaphore region that is shared between compute nodes, but it is mapped as uncached in the compute nodes, as shown in a block 1416. The UC mapping provides any update to this UC region is gets reflected on all shared nodes semaphore region. The uncached access from a compute node for these regions is expected to reach the target memory over the fabric to provide a response rather than locally caching the data. For example, for a write, the write will reach the target memory before write acknowledgement, and reads get the data from target memory rather than locally caching it.

In accordance with aspects of one embodiment, information regarding memory capacity, health, memory performance and link performance and storage capacity, health, storage performance and link performance is provided to a PSME from compute nodes when the PSME instructed the nodes to do deep discovery. The PSME then communicates corresponding information to the POD Manager (PODM), which is responsible for composing the system based on user needs.

Figure 7C:
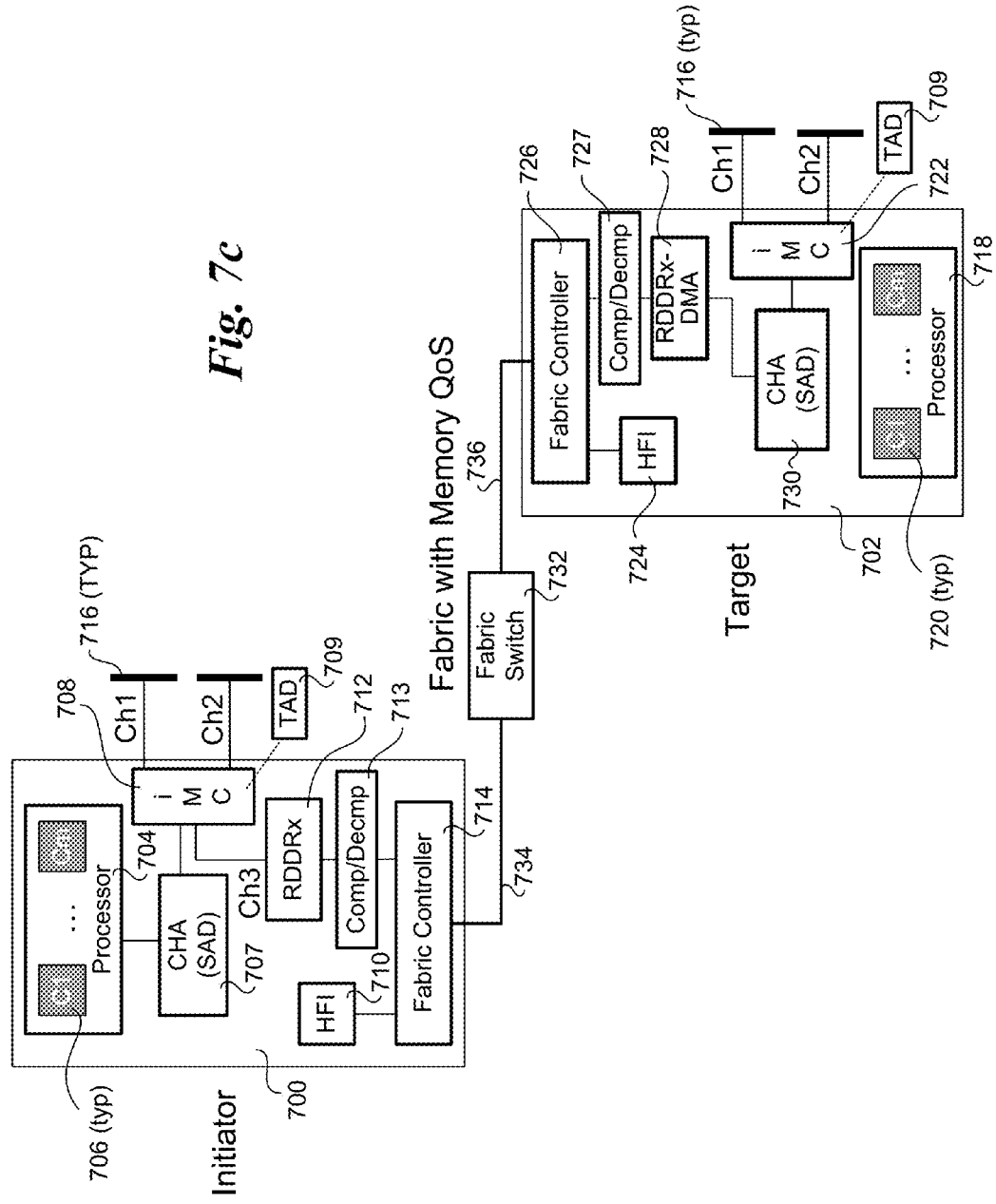
FIG. 7c illustrates an alternative configuration to FIG. 7 that further adds support for sending data over the fabric using data compression.

Another feature that may be implemented in some embodiments is support for compression. As illustrated in FIG. 7c, in one embodiment initiator 700 includes a compression/decompression logic block 713 that sits between RDDRx engine 709 and fabric controller 714. Similarly, target 702 includes a compression/decompression logic block 727 that sits between fabric controller 726 and RDDRx-DMA engine 728. Optionally, a compression/decompression logic block may be integrated in the fabric controller. Each compression/decompression logic block is configured to perform data compression and decompression using one or more data compression schemes, such as those known in the art.

Figure 15A:
FIGS. 15a and 15b are diagrams illustrating fabric packet formats supporting data compression, according to respective embodiments.
Figure 15B:

Exemplary embodiments of fabric packet formats supporting compression are shown in FIGS. 15a and 15b. Fabric packet format 1500a of FIG. 15a includes a Flit header 1502a, a data block 1504 (the packet payload data), and an ECC/CRC (Error Correction Code/Cyclic Redundancy Check) block 1506. Header 1502 a includes a message type field 1508a, a length field 1510, a source fabric node ID field 1512, a target fabric node ID field 1514, a data type flag 1516, and an optional ECC/CRC field 1518. If ECC/CRC field 1518 may be used in place of ECC/CRC block 1506.

Fabric packet format 1500b of FIG. 15b includes a Flit header 1502b, a data block 1504, and an ECC/CRC block 1506. Header 1502b a includes a message type field 1508b, a length field 1510, a source fabric node ID field 1512, a target fabric node ID field 1514, a data type flag 1516, and an optional ECC/CRC field 1518. The message type value in message type field 1508b is used to identify whether the message contains compressed or uncompressed data.

FIG. 16 shows a table 1600 illustrating an exemplary set of OpCodes used for compression. Table 1600 includes an OpCode field 1602, a data count repeat field 1604, and a data bytes field 1606. OpCode field 1602 includes various OpCodes that specify what type of compression scheme to use, while data bytes 1606 defines the length of the pattern used by the corresponding compression scheme. Data count repeat field 1604 identifies how many times the data bytes in a pattern are repeated.

In one embodiment, a software data class or data structure used for compression is as follows:

```
Data {
    OpCodeMajor: {0-Not Compressed, 1 - compressed}
    OpCodeMinor: {applicable only if data is compressed}
    Databytes
}
```

Under one embodiment, the determination to whether to compress a memory access request (or returned DATA) is dynamically made based on the size of the amount of data to be transferred over the fabric. Typically, the size of a read memory access request will be small, while the returned DATA may vary in size (depending on the read request). Accordingly, the read memory access request will generally be sent uncompressed, while the returned DATA may or not be compressed, depending on whether the latency of adding the compression/decompression processing is less than the reduction in latency in transferring the fabric packet over the fabric when comparing a compressed and uncompressed data payload. For memory writes, the size of the write request can vary (depending on how much data is to be written to the remote memory), while the returned write acknowledgement is small. Thus, a memory write may or may not employ compression, while the write acknowledgement will generally not be compressed.

Figure 17:
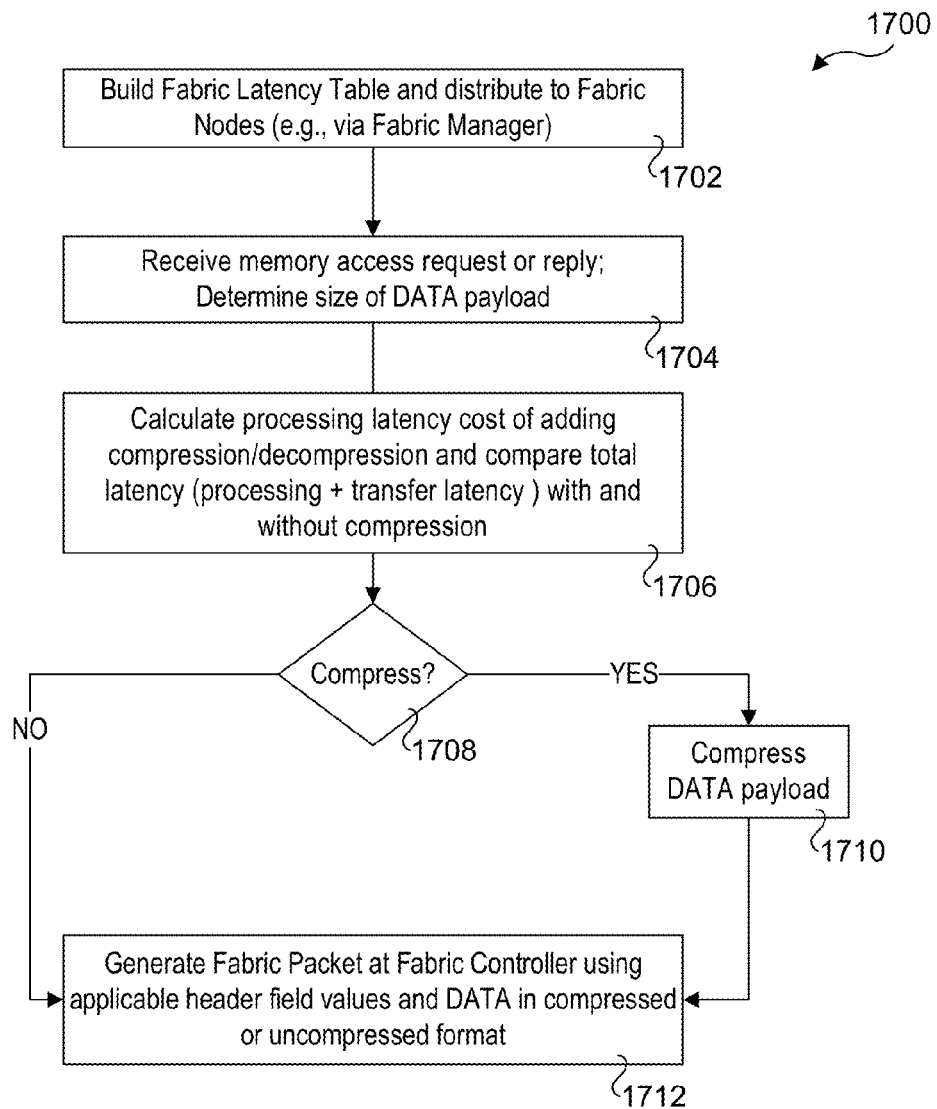
FIG. 17 is a flowchart illustrating operations and logic for implementing support for data compression in a fabric node, according to one embodiment.

FIG. 17 shows a flowchart 1700 for implementing operations and logic for one embodiment of fabric nodes that support compression. In a block 1702 a fabric latency table is built. Each entry in the latency table includes a pair of fabric endpoints (e.g., using the fabric node ID of each fabric endpoints, such as a source-destination or initiator-target fabric node ID pair) and a transfer latency for a baseline fabric packet between the fabric endpoints. For example, the baseline fabric packet may correspond to a packet with no payload, or could correspond to an average packet transfer latency that is either observed over time or calculated. The fabric latency table is then distributed to the fabric nodes attached to the fabric, such as via the Fabric Manager. Generally, the operation of block 1702 may be performed one or more times for a given operating session. In one embodiment, each fabric node is only sent a portion of the table for which the fabric node is a source or initiator node.

The remaining operations in flowchart 1700 are performed on an ongoing basis. In a block 1704, a memory access request or reply to a memory access request is received at a compression/decompression block. In a block 1706 a processing latency cost relating to the added amount of processing latency due to compression and decompression operations for the memory access request or reply data payload is determined. In one embodiment, the compression/decompression latency is calculated as a linear function of the size of the data payload, although other algorithms may be used, including use of a lookup table. A total latency (compression/decompression processing latency) plus data transfer latency with and without data compression is then performed.

In a decision block 1708 a determination is made to whether compression will reduce the total latency. If it will, the answer is YES, and the data payload is compressed in a block 1710. The logic then proceeds to a block 1712 in which a fabric packet is generated by the fabric controller using applicable header field values based on the type of compression used. If the answer to decision block 1708 is NO, the logic proceeds to block 1712 and the fabric packet is generated using header field values indicating the packet data payload is not compressed.

Under an alternative implementation, the fabric latency table includes three fields: a source fabric node ID, a destination (or target) fabric node ID, and a data size threshold. Under this implementation, a determination is made in advance at which point the size of the data payload is large enough such that compression provides a net reduction in total latency. Under this implementation, the operation of block 1706 is skipped, and the determination or whether to compress or not in decision block 1708 is based on whether the data payload exceeds the data size threshold.

Generally, the logic in various blocks illustrated in the Figures herein may be implemented using embedded circuitry and logic, such as programmable logic and/or via corresponding software modules comprising instructions executed on a processor. For example, logic for performing the operations described herein associated with various blocks in FIG. 7, including one or more of CHA 702, RDDRx engine 712, RDDRx-DMA engine 728, and CHA 730, may be implemented by executing software instructions on processor 706 (for initiator 700) and on processor 718 (for target 702). Optionally, all or a portion of the logic may be implemented via programmable logic, such as but not limited to an embedded or standalone field programmable gate array (FPGA).

Further aspects of the subject matter described herein are set out in the following numbered clauses:

1. A method, comprising:
composing memory resources for a compute node in a first pooled system drawer installed in a rack, the compute node including at least one processor coupled to at least one local memory device, the memory resources for the compute node including the at least one local memory device and at least one remote memory device accessed via a disaggregated memory node in a second pooled system drawer installed in the rack;
configuring the compute node to detect a first memory access request originating from a processor in the compute node and corresponding to a memory region in a first remote memory device from among the at least one remote memory device to forward data relating to the first memory access request to the disaggregated memory node via a first fabric packet sent over a fabric coupled between the compute node and the disaggregated memory node;
receiving the first fabric packet at the disaggregated memory node, extracting the data relating to the first memory access request and performing a first memory access of the first remote memory device corresponding to the first memory access request; and
returning data corresponding to the first memory access from the disaggregated memory node to the compute node via a second fabric packet sent over the fabric.

2. The method of clause 1, wherein the at least one remote memory device comprises storage class memory (SCM), and the disaggregated memory node comprises an SCM node in which a plurality of SCM memory devices are installed.

3. The method of clause 2, wherein the remote memory device comprises a byte addressable three-dimensional crosspoint memory.

4. The method of any of the preceding clauses, wherein the first memory access request includes a system physical address (SPA) of memory to be accessed and a plurality of nodes are coupled to the fabric, each node including a fabric node identifier (fabric node ID), the method further comprising:

determining, based on the SPA, a fabric node ID of the node on the fabric corresponding to the disaggregating memory node; and generating, at the compute node, the first fabric packet to include the fabric node ID that is determined as a destination fabric node ID.

5. The method of clause 4, further comprising:

determining, based on the SPA, a device physical address (DPA) corresponding to a physical address in the first remote memory device at which the first memory access is to be performed.

6. The method of clause 5, wherein the disaggregated memory node includes a memory controller coupled to a plurality of memory devices via a plurality of channels, each channel having a channel ID and coupled to one or more memory devices, each memory device coupled to a given channel having a respective memory device ID, the method further comprising:

determining, using data contained in the first fabric packet and via logic on the disaggregated memory node, the channel ID and memory device ID corresponding to a memory device to be accessed to perform the first memory access, the memory device to be accessed comprising the first memory device; and accessing the first memory device via a channel of the memory controller corresponding to the channel ID that is determined.

7. The method of clause 6, wherein the first fabric packet includes a source fabric node ID corresponding to the compute node, further comprising:

constructing a local SPA using the source fabric node ID and the DPA;

determining, via the local SPA, the channel ID, memory device ID, and a local DPA; and using the channel ID, memory device ID, and local DPA to perform the first memory access.

8. The method of clause 7, further comprising:

implementing a DPA range table in memory on the disaggregated memory node, the DPA range table including a fabric node ID column containing a fabric node ID for each row, a DPA range column including a DPA range for each row, and an SPA base address column containing an SPA base address for each row; and determining an SPA base address using the fabric node ID of the compute node and the DPA as lookup values for the DPA range table; and constructing the local SPA as a function of the SPA base address for a given DPA range.

9. The method of clause 7, further comprising:

implementing an access permission lookup table in memory on the disaggregated memory node, access permission lookup table including information defining Read and Write access rights for each of a plurality of compute nodes, for respective SPA ranges; and determining, using the fabric node ID of the compute node and the local SPA as inputs to the access permission lookup table, whether a memory access corresponding to the memory access request is permitted.

10. The method of any of the preceding clauses, further comprising:

detecting a second memory access request originating from a processor in the compute node and corresponding to a memory region in a first local memory device from among the at least one local memory device; and performing the second access request via a memory controller on the compute node.

11. The method of clause 10, wherein each of the first and second memory access requests includes a respective system physical address (SPA) of memory to be accessed to service the memory access request, and the method further comprises determining, for each of the first and second memory access requests as a function of the SPA for that memory access request, whether the memory access request is to be serviced by accessing a local memory device on the compute node or accessing a remote memory device on the disaggregated memory node.

12. The method of clause 10, wherein each of the first and second memory access requests is generated by one of an operating system or application running on the compute node and the operating system or application is unaware whether the first and second memory access requests are being services by accessing a local memory device or a remote memory device.

13. The method of any of the preceding clauses, further comprising employing data compression for at least on of data contained in the first fabric packet and data contained in the second fabric packet.

14. A disaggregated memory node, comprising:

a fabric controller, configured to be communicatively coupled to a fabric;

a memory controller, having a plurality of channels;

a plurality of memory devices coupled to the memory controller via the plurality of channels, wherein each channel is coupled to at least one memory device;

wherein the disaggregated memory node either comprises a pooled memory drawer configured to be installed in a rack or is configured to be installed in a pooled memory drawer including a plurality of disaggregated memory nodes that is configured to be installed in the rack, and wherein the disaggregated memory node is configured to, receive a first fabric packet sent over the fabric from one of a plurality of compute nodes in a pooled compute drawer in the rack containing data relating to a memory access request originating from a processor in the compute node, the data including memory address information;

determine, based on the memory address information, a memory device in the disaggregated memory node containing data corresponding to the memory access request;

access the memory device that is determined to service the memory access request; and return data corresponding to the memory access request in a second fabric packet sent via the fabric controller and destined for the compute node.

15. The disaggregated memory node of clause 14, wherein the plurality of memory devices comprise storage class memory (SCM), and the disaggregated memory node comprises an SCM node.

16. The disaggregated memory node of clause 15, wherein the plurality of memory devices comprises byte addressable three-dimensional crosspoint memory DIMMs (Dual Inline Memory Modules).

17. The disaggregated memory node of any of clauses 14-16, wherein each channel has a channel identifier (ID) and each memory device connected to a respective channel has a memory device ID, and wherein the disaggregated memory node is further configured to determine, using data contained in the first fabric packet, the channel ID and memory device ID corresponding to the memory device to be accessed to service the memory access request.

18. The disaggregated memory node of clause 17, wherein the first fabric packet includes a source fabric node ID corresponding to the compute node and a device physical address (DPA), and wherein the disaggregated memory node is further configured to:

construct a local system physical address (SPA) using the source fabric node ID and the DPA;

determine, via the local SPA, the channel ID, memory device ID, and a local DPA; and access the memory device via the memory controller using the channel ID, memory device ID, and local DPA.

19. The disaggregated memory node of clause 18, further comprising:

memory containing a DPA range table including a fabric node ID column containing a fabric node ID for each row, a DPA range column including a DPA range for each row, and an SPA base address column containing an SPA base address for each row, and wherein the disaggregated memory node is further configured to, determine a SPA base address using the fabric node ID of the compute node and the DPA as lookup values for the DPA range table; and construct the local SPA as a function of the SPA base address.

20. The disaggregated memory node of clause 19, further comprising:

a remote DDR-based direct memory access (RDDRx-DMA) engine, coupled to the fabric controller, wherein the RDDRx-DMA engine comprises circuitry and logic configured to construct the local SPA using the source fabric node ID, the DPA, and the DPA range table.

21. The disaggregated memory node of clause 18, further comprising:

a target address decoder (TAD), coupled to the memory controller, comprising circuitry and logic to decode the local SPA and output the channel ID, memory device ID, and local DPA and forward the channel ID, memory device ID, and local DPA to the memory controller.

22. The disaggregated memory node of clause 21, further comprising a caching agent including the TAD.

23. The disaggregated memory node of any of clauses 14-22, further comprising:

memory containing an access permission lookup table including information defining, for each of a plurality of SPA ranges, Read and Write access rights for each of a plurality of compute nodes configured to access memory devices on the disaggregated memory node, wherein the disaggregated memory node is further configured to determine, using the fabric node ID of the compute node and the local SPA as inputs to the access permission lookup table, whether a memory access corresponding to the memory access request is permitted.

24. The disaggregated memory node of any of clauses 14-23, further comprising:

a processor; and memory in which a plurality of instructions are stored, the instructions configured to be executed on the processor to determine the memory device in the disaggregated memory node containing the data corresponding to the memory access request.

25. The disaggregated memory node of any of clauses 14-24, further comprising:

a compression/decompression block, configured to decompress data in a fabric packet including compressed data that is received by the disaggregated memory node and to compress data in selected fabric packets that are sent by the disaggregated memory node.

26. The disaggregated memory node of any of clauses 14-25, wherein the fabric comprises an Intel OmniPath fabric.

27. A compute node, comprising:

a processor;

a memory controller, having at least one channel and operatively coupled to the processor;

one or more local memory devices, each coupled to the memory controller via a channel; and a fabric controller, configured to be communicatively coupled to a fabric, wherein the compute node is configured to be installed in a pooled compute drawer in a rack including at least one disaggregated memory node, each disaggregated memory node including a plurality of remote memory devices, coupled to the fabric configured to provide access to memory stored in the plurality of remote memory devices, and wherein to compute node is further configured to, generate a first memory access request;

determine the first memory access request is to be serviced by accessing a memory region in a first remote memory device in a first disaggregated memory node;

generate a first fabric packet containing data relating to the first memory access request and second the first fabric packet outbound from the fabric controller onto the fabric to be delivered to the first disaggregated memory node; and receive a second fabric packet returned from the disaggregated memory node comprising a response packet containing data returned by the disaggregated memory node after servicing the first memory access request.

28. The compute node of clause 27, wherein each of the one or more local memory devices and the first remote memory device comprises storage class memory (SCM), and the first disaggregated memory node comprises an SCM node in which a plurality of SCM memory devices are installed.

29. The compute node of clause 28, wherein each of the SCM memory devices comprises a comprises a byte addressable three-dimensional crosspoint memory.

30. The compute node of any of clauses 27-29, wherein the first memory access request includes a system physical address (SPA) of memory to be accessed and wherein a plurality of nodes are coupled to the fabric, each node including a fabric node identifier (fabric node ID), and wherein the compute node is further configured to:

determine, based on the SPA, a fabric node ID of the node on the fabric corresponding to the first disaggregating memory node; and generate the first fabric packet to include the fabric node ID that is determined as a destination fabric node ID.

31. The compute node of clause 30, further configured to determine, based on the SPA, a device physical address (DPA) corresponding to a physical address in the first remote memory device to be accessed to service the first memory access request.

32. The compute node of any of clauses 27-31, further configured to:

generate a second memory access request;

determine the second memory access request is to be serviced by accessing a local memory device; and service the second memory access request by accessing the local memory device via the memory controller.

33. The compute node of clause 32, wherein each of the first and second memory access requests includes a respective system physical address (SPA) of memory to be accessed to service the memory access request, and wherein the compute node is further configured to:

determine, for each of the first and second memory access requests as a function of the SPA for that memory access request, whether the memory access request is to be serviced by accessing a local memory device on the compute node or accessing a remote memory device on a disaggregated memory node.

34. The compute node of clause 32, wherein each of the first and second memory access requests is generated by one of an operating system or application running on the compute node and the operating system or application is unaware whether the first and second memory access requests are being serviced by accessing a local memory device or a remote memory device.

35. The compute node of clause 32, wherein each of the first and second memory access requests includes a respective system physical address (SPA) of memory to be accessed to service the memory access request, and wherein the compute node is further configured to:

determine, by decoding the SPA for the second memory access request, a channel identifier (ID), a memory device ID, and a device physical address to be used to service the second memory access request; and forward the channel ID, memory device ID, and the DPA to the memory controller to service the second memory access request.

36. The compute node of clause 32, wherein each of the first and second memory access requests includes a respective system physical address (SPA) of memory to be accessed to service the memory access request, wherein a plurality of nodes are coupled to the fabric, each node including a fabric node identifier (fabric node ID), and wherein the compute node is further configured to:

determine, by decoding the SPA for the first memory access request, a channel identifier (ID), a memory device ID, and a device physical address to be used to service the first memory access request; and forward the channel ID, memory device ID, and the DPA to the memory controller to service the second memory access request;

determine, via the memory controller, that the channel ID memory device ID, and DPA do not correspond to a local memory device coupled to the memory controller; and employ the DPA to determine a fabric node ID corresponding to first disaggregated memory node.

37. The compute node of clause 36, further comprising a remote DDR-based (RDDRx) engine, coupled to the memory controller, and wherein the compute node is further configured to, in response to the memory controller determining that the channel ID memory device ID, and DPA do not correspond to a local memory device coupled to the memory controller, forward the DPA to the RDDRx engine; and determine, via the RDDRx engine, the fabric node ID for the first disaggregated memory node.

38. The compute node of any of clauses 27-37, further comprising:

a compression/decompression block, configured to decompress data in a fabric packet including compressed data that is received by the compute node and to compress data in selected fabric packets that are sent by the compute node.

39. The compute node of any of clauses 27-37, wherein the fabric comprises an Intel OmniPath fabric.

40. A disaggregated memory node, comprising:

a fabric controller, configured to be communicatively coupled to a fabric;

a memory controller, having a plurality of channels;

a plurality of memory devices coupled to the memory controller via the plurality of channels, wherein each channel is coupled to at least one memory device;

wherein the disaggregated memory node either comprises a pooled memory drawer configured to be installed in a rack or is configured to be installed in a pooled memory drawer including a plurality of disaggregated memory nodes that is configured to be installed in the rack, and wherein the disaggregated memory node further comprises means for, receiving a first fabric packet sent over the fabric from one of a plurality of compute nodes in a pooled compute drawer in the rack containing data relating to a memory access request originating from a processor in the compute node, the data including memory address information;

determining, based on the memory address information, a memory device in the disaggregated memory node containing data corresponding to the memory access request;

accessing the memory device that is determined to service the memory access request; and returning data corresponding to the memory access request in a second fabric packet sent via the fabric controller and destined for the compute node.

41. The disaggregated memory node of clause 40, wherein the plurality of memory devices comprise storage class memory (SCM), and the disaggregated memory node comprises an SCM node.

42. The disaggregated memory node of clause 41, wherein the plurality of memory devices comprise byte addressable three-dimensional crosspoint memory DIMMs (Dual Inline Memory Modules).

43. The disaggregated memory node of any of clauses 40-42, wherein each channel has a channel identifier (ID) and each memory device connected to a respective channel has a memory device ID, and wherein the disaggregated memory node further comprises means for determining, using data contained in the first fabric packet, the channel ID and memory device ID corresponding to the memory device to be accessed to service the memory access request.

44. The disaggregated memory node of clause 43, wherein the first fabric packet includes a source fabric node ID corresponding to the compute node and a device physical address (DPA), and wherein the disaggregated memory further comprises means for:

constructing a local system physical address (SPA) using the source fabric node ID and the DPA;

determining, via the local SPA, the channel ID, memory device ID, and a local DPA; and accessing the memory device via the memory controller using the channel ID, memory device ID, and local DPA.

45. The disaggregated memory node of clause 44, further comprising:

memory containing a DPA range table including a fabric node ID column containing a fabric node ID for each row, a DPA range column including a DPA range for each row, and an SPA base address column containing an SPA base address for each row; and means for, determining a SPA base address using the fabric node ID of the compute node and the DPA as lookup values for the DPA range table; and constructing the local SPA as a function of the SPA base address.

46. The disaggregated memory node of clause 45, further comprising:

a remote DDR-based direct memory access (RDDRx-DMA) engine, coupled to the fabric controller, wherein the RDDRx-DMA engine comprises means for constructing the local SPA using the source fabric node ID, the DPA, and the DPA range table.

47. The disaggregated memory node of clause 44, further comprising:

a target address decoder (TAD), coupled to the memory controller, comprising means for decoding the local SPA and output the channel ID, memory device ID, and local DPA and forward the channel ID, memory device ID, and local DPA to the memory controller.

48. The disaggregated memory node of clause 47, further comprising a caching agent including the TAD.

49. The disaggregated memory node of any of clauses 40-48, further comprising:

memory containing an access permission lookup table including information defining, for each of a plurality of SPA ranges, Read and Write access rights for each of a plurality of compute nodes configured to access memory devices on the disaggregated memory node;

means for determining, using the fabric node ID of the compute node and the local SPA as inputs to the access permission lookup table, whether a memory access corresponding to the memory access request is permitted.

50. The disaggregated memory node of any of clauses 40-49, further comprising:

a processor; and memory in which a plurality of instructions are stored, the instructions configured to be executed on the processor to determine the memory device in the disaggregated memory node containing the data corresponding to the memory access request.

51. The disaggregated memory node of any of clauses 40-50, further comprising:

means for decompressing data in a fabric packet including compressed data that is received by the disaggregated memory node and means for compressing data in selected fabric packets that are sent by the disaggregated memory node.

52. A compute node, comprising:

a processor;

a memory controller, having at least one channel and operatively coupled to the processor;

one or more local memory devices, each coupled to the memory controller via a channel; and a fabric controller, configured to be communicatively coupled to a fabric, wherein the compute node is configured to be installed in a pooled compute drawer in a rack including at least one disaggregated memory node, each disaggregated memory node including a plurality of remote memory devices, coupled to the fabric configured to provide access to memory stored in the plurality of remote memory devices, and wherein to compute node further includes means for, generating a first memory access request;

determining the first memory access request is to be serviced by accessing a memory region in a first remote memory device in a first disaggregated memory node;

generating a first fabric packet containing data relating to the first memory access request and second the first fabric packet outbound from the fabric controller onto the fabric to be delivered to the first disaggregated memory node; and receiving a second fabric packet returned from the disaggregated memory node comprising a response packet containing data returned by the disaggregated memory node after servicing the first memory access request.

53. The compute node of clause 52, wherein each of the one or more local memory devices and the first remote memory device comprises storage class memory (SCM), and the first disaggregated memory node comprises an SCM node in which a plurality of SCM memory devices are installed.

54. The compute node of clause 53, wherein each of the one or more local memory devices comprises a byte addressable three-dimensional crosspoint memory DIMM (Dual Inline Memory Module).

55. The compute node of any of clauses 52-54, wherein the first memory access request includes a system physical address (SPA) of memory to be accessed and wherein a plurality of nodes are coupled to the fabric, each node including a fabric node identifier (fabric node ID), and wherein the compute node further includes means for:

determining, based on the SPA, a fabric node ID of the node on the fabric corresponding to the first disaggregating memory node; and generating the first fabric packet to include the fabric node ID that is determined as a destination fabric node ID.

56. The compute node of clause 55, further configured to determine, based on the SPA, a device physical address (DPA) corresponding to a physical address in the first remote memory device to be accessed to service the first memory access request.

57. The compute node of any of clauses 52-56, further comprising means for:

generating a second memory access request;

determining the second memory access request is to be serviced by accessing a local memory device; and servicing the second memory access request by accessing the local memory device via the memory controller.

58. The compute node of clause 57, wherein each of the first and second memory access requests includes a respective system physical address (SPA) of memory to be accessed to service the memory access request, and wherein the compute node further comprises means for:

determining, for each of the first and second memory access requests as a function of the SPA for that memory access request, whether the memory access request is to be serviced by accessing a local memory device on the compute node or accessing a remote memory device on a disaggregated memory node.

59. The compute node of clause 57, wherein each of the first and second memory access requests is generated by one of an operating system or application running on the compute node and the operating system or application is unaware whether the first and second memory access requests are being serviced by accessing a local memory device or a remote memory device.

60. The compute node of clause 57, wherein each of the first and second memory access requests includes a respective system physical address (SPA) of memory to be accessed to service the memory access request, and wherein the compute node further comprises means for:

determining, by decoding the SPA for the second memory access request, a channel identifier (ID), a memory device ID, and a device physical address to be used to service the second memory access request; and forwarding the channel ID, memory device ID, and the DPA to the memory controller to service the second memory access request.

61. The compute node of clause 57, wherein each of the first and second memory access requests includes a respective system physical address (SPA) of memory to be accessed to service the memory access request, wherein a plurality of nodes are coupled to the fabric, each node including a fabric node identifier (fabric node ID), and wherein the compute node further comprises means for:

determining, by decoding the SPA for the first memory access request, a channel identifier (ID), a memory device ID, and a device physical address to be used to service the first memory access request; and forwarding the channel ID, memory device ID, and the DPA to the memory controller to service the second memory access request;

determining, via the memory controller, that the channel ID memory device ID, and DPA do not correspond to a local memory device coupled to the memory controller; and employing the DPA to determine a fabric node ID corresponding to first disaggregated memory node.

62. The compute node of clause 61, further comprising a remote DDR-based (RDDRx) engine, coupled to the memory controller, and further comprising means for:

in response to the memory controller determining that the channel ID memory device ID, and DPA do not correspond to a local memory device coupled to the memory controller, forwarding the DPA to the RDDRx engine; and determining, via the RDDRx engine, the fabric node ID for the first disaggregated memory node.

63. The compute node of any of clauses 52-62, further comprising:

means for decompressing data in a fabric packet including compressed data that is received by the compute node and means for compressing data in selected fabric packets that are sent by the compute node.

64. The compute node of any of clauses 52-63, wherein the fabric comprises an Intel OmniPath fabric.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Letters, such as 'M' and 'N' in the foregoing detailed description and drawings are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   composing memory resources for a compute node in a first pooled system drawer installed in a rack, the compute node including at least one processor coupled to at least one local memory device, the memory resources for the compute node including the at least one local memory device and at least one remote memory device accessed via a disaggregated memory node in a second pooled system drawer installed in the rack;
   configuring the compute node to detect a first memory access request originating from a processor in the compute node and corresponding to a memory region in a first remote memory device from among the at least one remote memory device to forward data relating to the first memory access request to the disaggregated memory node via a first fabric packet sent over a fabric coupled between the compute node and the disaggregated memory node;
   receiving the first fabric packet at the disaggregated memory node, extracting the data relating to the first memory access request and performing a first memory access of the first remote memory device corresponding to the first memory access request; and
   returning data corresponding to the first memory access from the disaggregated memory node to the compute node via a second fabric packet sent over the fabric.

2. The method of claim 1, wherein the at least one remote memory device comprises storage class memory (SCM), and the disaggregated memory node comprises an SCM node in which a plurality of SCM memory devices are installed.

3. The method of claim 2, wherein the remote memory device comprises a byte addressable three-dimensional crosspoint memory.

4. The method of claim 1, wherein the first memory access request includes a system physical address (SPA) of memory to be accessed and a plurality of nodes are coupled to the fabric, each node including a fabric node identifier (fabric node ID), the method further comprising:
   determining, based on the SPA, a fabric node ID of the node on the fabric corresponding to the disaggregating memory node; and
   generating, at the compute node, the first fabric packet to include the fabric node ID that is determined as a destination fabric node ID.

5. The method of claim 4, further comprising:
   determining, based on the SPA, a device physical address (DPA) corresponding to a physical address in the first remote memory device at which the first memory access is to be performed.

6. The method of claim 5, wherein the disaggregated memory node includes a memory controller coupled to a plurality of memory devices via a plurality of channels, each channel having a channel ID and coupled to one or more memory devices, each memory device coupled to a given channel having a respective memory device ID, the method further comprising:
   determining, using data contained in the first fabric packet and via logic on the disaggregated memory node, the channel ID and memory device ID corresponding to a memory device to be accessed to perform the first memory access, the memory device to be accessed comprising the first memory device; and
   accessing the first memory device via a channel of the memory controller corresponding to the channel ID that is determined.

7. The method of claim 6, wherein the first fabric packet includes a source fabric node ID corresponding to the compute node, further comprising:
   constructing a local SPA using the source fabric node ID and the DPA;
   determining, via the local SPA, the channel ID, memory device ID, and a local DPA; and
   using the channel ID, memory device ID, and local DPA to perform the first memory access.

8. The method of claim 7, further comprising:
   implementing a DPA range table in memory on the disaggregated memory node, the DPA range table including a fabric node ID column containing a fabric node ID for each row, a DPA range column including a DPA range for each row, and an SPA base address column containing an SPA base address for each row; and
   determining an SPA base address using the fabric node ID of the compute node and the DPA as lookup values for the DPA range table; and
   constructing the local SPA as a function of the SPA base address for a given DPA range.

9. The method of claim 7, further comprising:
implementing an access permission lookup table in memory on the disaggregated memory node, access permission lookup table including information defining Read and Write access rights for each of a plurality of compute nodes, for respective SPA ranges; and
determining, using the fabric node ID of the compute node and the local SPA as inputs to the access permission lookup table, whether a memory access corresponding to the memory access request is permitted.

10. The method of claim 1, further comprising employing data compression for at least one of data contained in the first fabric packet and data contained in the second fabric packet.

11. A disaggregated memory node, comprising:
a fabric controller, configured to be communicatively coupled to a fabric;
a memory controller, having a plurality of channels;
a plurality of memory devices coupled to the memory controller via the plurality of channels, wherein each channel is coupled to at least one memory device;
wherein the disaggregated memory node either comprises a pooled memory drawer configured to be installed in a rack or is configured to be installed in a pooled memory drawer including a plurality of disaggregated memory nodes that is configured to be installed in the rack, and wherein the disaggregated memory node is configured to,
receive a first fabric packet sent over the fabric from one of a plurality of compute nodes in a pooled compute drawer in the rack containing data relating to a memory access request originating from a processor in the compute node, the data including memory address information;
determine, based on the memory address information, a memory device in the disaggregated memory node containing data corresponding to the memory access request;
access the memory device that is determined to service the memory access request; and
return data corresponding to the memory access request in a second fabric packet sent via the fabric controller and destined for the compute node.

12. The disaggregated memory node of claim 11, wherein the plurality of memory devices comprise storage class memory (SCM), and the disaggregated memory node comprises an SCM node.

13. The disaggregated memory node of claim 11, wherein each channel has a channel identifier (ID) and each memory device connected to a respective channel has a memory device ID, and wherein the disaggregated memory node is further configured to determine, using data contained in the first fabric packet, the channel ID and memory device ID corresponding to the memory device to be accessed to service the memory access request.

14. The disaggregated memory node of claim 13, wherein the first fabric packet includes a source fabric node ID corresponding to the compute node and a device physical address (DPA), and wherein the disaggregated memory node is further configured to:
construct a local system physical address (SPA) using the source fabric node ID and the DPA;
determine, via the local SPA, the channel ID, memory device ID, and a local DPA; and
access the memory device via the memory controller using the channel ID, memory device ID, and local DPA.

15. The disaggregated memory node of claim 14, further comprising:
memory containing a DPA range table including a fabric node ID column containing a fabric node ID for each row, a DPA range column including a DPA range for each row, and an SPA base address column containing an SPA base address for each row,
and wherein the disaggregated memory node is further configured to,
determine a SPA base address using the fabric node ID of the compute node and the DPA as lookup values for the DPA range table; and
construct the local SPA as a function of the SPA base address.

16. The disaggregated memory node of claim 15, further comprising:
a remote DDR-based direct memory access (RDDRx-DMA) engine, coupled to the fabric controller, wherein the RDDRx-DMA engine comprises circuitry and logic configured to construct the local SPA using the source fabric node ID, the DPA, and the DPA range table.

17. The disaggregated memory node of claim 14, further comprising:
a target address decoder (TAD), coupled to the memory controller, comprising circuitry and logic to decode the local SPA and output the channel ID, memory device ID, and local DPA and forward the channel ID, memory device ID, and local DPA to the memory controller.

18. The disaggregated memory node of claim 14, further comprising:
memory containing an access permission lookup table including information defining, for each of a plurality of SPA ranges, Read and Write access rights for each of a plurality of compute nodes configured to access memory devices on the disaggregated memory node,
wherein the disaggregated memory node is further configured to determine, using the fabric node ID of the compute node and the local SPA as inputs to the access permission lookup table, whether a memory access corresponding to the memory access request is permitted.

19. A compute node, comprising:
a processor;
a memory controller, having at least one channel and operatively coupled to the processor;
one or more local memory devices, each coupled to the memory controller via a channel; and
a fabric controller, configured to be communicatively coupled to a fabric,
wherein the compute node is configured to be installed in a pooled compute drawer in a rack including at least one disaggregated memory node, each disaggregated memory node including a plurality of remote memory devices, coupled to the fabric configured to provide access to memory stored in the plurality of remote memory devices, and wherein to compute node is further configured to,
generate a first memory access request;
determine the first memory access request is to be serviced by accessing a memory region in a first remote memory device in a first disaggregated memory node;
generate a first fabric packet containing data relating to the first memory access request and second the first fabric packet outbound from the fabric controller onto the fabric to be delivered to the first disaggregated memory node; and receive a second fabric packet returned from the disaggregated memory node comprising a response packet containing data returned by the disaggregated memory node after servicing the first memory access request.

20. The compute node of claim 19, wherein each of the one or more local memory devices and the first remote memory device comprises storage class memory (SCM), and the first disaggregated memory node comprises an SCM node in which a plurality of SCM memory devices are installed.

21. The compute node of claim 20, wherein at least one of the one or more local memory devices comprises a byte addressable three-dimensional crosspoint memory DIMM (Dual Inline Memory Module).

22. The compute node of claim 19, wherein the first memory access request includes a system physical address (SPA) of memory to be accessed and wherein a plurality of nodes are coupled to the fabric, each node including a fabric node identifier (fabric node ID), and wherein the compute node is further configured to:
  determine, based on the SPA, a fabric node ID of the node on the fabric corresponding to the first disaggregating memory node; and
  generate the first fabric packet to include the fabric node ID that is determined as a destination fabric node ID.

23. The compute node of claim 22, further configured to determine, based on the SPA, a device physical address (DPA) corresponding to a physical address in the first remote memory device to be accessed to service the first memory access request.

24. The compute node of claim 19, further configured to:
  generate a second memory access request;
  determine the second memory access request is to be serviced by accessing a local memory device; and
  service the second memory access request by accessing the local memory device via the memory controller.

25. The compute node of claim 24, wherein each of the first and second memory access requests includes a respective system physical address (SPA) of memory to be accessed to service the memory access request, and wherein the compute node is further configured to:
  determine, for each of the first and second memory access requests as a function of the SPA for that memory access request, whether the memory access request is to be serviced by accessing a local memory device on the compute node or accessing a remote memory device on a disaggregated memory node.

* * * * *